US012638642B2

(12) United States Patent
Merrick et al.

(10) Patent No.: US 12,638,642 B2
(45) Date of Patent: May 26, 2026

(54) INSTALLING AN OPTICAL FIBER

(71) Applicant: COMMSCOPE TECHNOLOGIES LLC, Hickory, NC (US)

(72) Inventors: Levi T. Merrick, Shakopee, MN (US); Yu Lu, Eden Prairie, MN (US); Steven Conrad Zimmel, Minneapolis, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 159 days.

(21) Appl. No.: 17/923,519

(22) PCT Filed: May 13, 2021

(86) PCT No.: PCT/US2021/032284
§ 371 (c)(1),
(2) Date: Nov. 4, 2022

(87) PCT Pub. No.: WO2021/231752
PCT Pub. Date: Nov. 18, 2021

(65) Prior Publication Data
US 2023/0185031 A1     Jun. 15, 2023

Related U.S. Application Data

(60) Provisional application No. 63/024,151, filed on May 13, 2020.

(51) Int. Cl.
*G02B 6/38* (2006.01)
*G02B 6/50* (2006.01)

(52) U.S. Cl.
CPC ........... *G02B 6/387* (2013.01); *G02B 6/3821* (2013.01); *G02B 6/3887* (2013.01); *G02B 6/50* (2013.01)

(58) Field of Classification Search
CPC .... G02B 6/3821; G02B 6/3869; G02B 6/387; G02B 6/3871; G02B 6/50; G02B 6/52; G02B 6/54
See application file for complete search history.

(56) References Cited

U.S. PATENT DOCUMENTS

| 4,201,444 A | 5/1980 | McCartney et al. |
| 4,217,030 A | 8/1980 | Howarth |

(Continued)

FOREIGN PATENT DOCUMENTS

| CN | 1175002 A | 3/1998 |
| CN | 1910488 A | 2/2007 |

(Continued)

OTHER PUBLICATIONS

International Search Report and Written Opinion of the International Searching Authority for International Patent Application No. PCT/US2021/032284 mailed Sep. 6, 2021, 12 pages.

(Continued)

*Primary Examiner* — Michael Stahl
(74) *Attorney, Agent, or Firm* — Merchant & Gould P.C.

(57) ABSTRACT

To install a connectorized cable assembly, a cable terminated at a connector core is pushed through a duct. The connector core has a maximum outer diameter of no more than 5 mm to facilitate passage of the connector core through the duct. A plug body is mounted over the connector core after the connector core exits the duct. No intermediate assembly steps are performed on the connector core between being pushed through the duct and being inserted into the plug body.

18 Claims, 19 Drawing Sheets

(56)        References Cited

U.S. PATENT DOCUMENTS

| | | | |
|---|---|---|---|
| 4,268,115 A | | 5/1981 | Slemon et al. |
| 4,327,964 A | | 5/1982 | Haesly et al. |
| 4,635,875 A | | 1/1987 | Apple |
| 4,691,988 A | | 9/1987 | Tremblay et al. |
| 4,715,675 A | | 12/1987 | Kevern et al. |
| 4,762,389 A | | 8/1988 | Kaihara |
| 5,212,752 A | | 5/1993 | Stephenson et al. |
| 5,216,733 A | | 6/1993 | Nagase et al. |
| 5,231,685 A | | 7/1993 | Hanzawa et al. |
| 5,245,683 A | | 9/1993 | Belenkiy et al. |
| 5,253,315 A | | 10/1993 | Fentress |
| 5,261,019 A | | 11/1993 | Beard et al. |
| 5,287,425 A | | 2/1994 | Chang |
| 5,452,386 A | | 9/1995 | Van Woesik |
| 5,465,313 A | | 11/1995 | Belenkiy et al. |
| 5,471,713 A | | 12/1995 | Alter et al. |
| 5,481,634 A | * | 1/1996 | Anderson ............ G02B 6/3893 |
| | | | 385/60 |
| 5,524,159 A | | 6/1996 | Turgeon et al. |
| 5,619,610 A | | 4/1997 | King et al. |
| 5,637,010 A | | 6/1997 | Jost et al. |
| 5,640,476 A | | 6/1997 | Womack et al. |
| 5,682,541 A | | 10/1997 | Lee et al. |
| 5,809,192 A | | 9/1998 | Manning et al. |
| 5,862,289 A | | 1/1999 | Walter et al. |
| 5,863,083 A | | 1/1999 | Giebel et al. |
| 5,897,393 A | | 4/1999 | Haftmann |
| 5,898,808 A | | 4/1999 | Morlion et al. |
| 5,915,058 A | | 6/1999 | Clairardin et al. |
| 5,946,435 A | | 8/1999 | Zheng et al. |
| 5,946,436 A | | 8/1999 | Takashi |
| 5,953,475 A | | 9/1999 | Beier et al. |
| 6,019,520 A | | 2/2000 | Lin et al. |
| 6,079,881 A | | 6/2000 | Roth |
| 6,081,647 A | | 6/2000 | Roth et al. |
| 6,151,432 A | | 11/2000 | Nakajima et al. |
| 6,154,597 A | | 11/2000 | Roth |
| 6,245,999 B1 | | 6/2001 | Costigan et al. |
| 6,287,018 B1 | | 9/2001 | Andrews et al. |
| 6,296,399 B1 | | 10/2001 | Halbach et al. |
| 6,325,547 B1 | | 12/2001 | Cammons et al. |
| 6,396,993 B1 | | 5/2002 | Giebel et al. |
| 6,398,422 B1 | | 6/2002 | Szilagyi et al. |
| 6,419,399 B1 | | 7/2002 | Loder et al. |
| 6,428,215 B1 | | 8/2002 | Nault |
| 6,429,373 B1 | | 8/2002 | Scrimpshire et al. |
| 6,540,410 B2 | | 4/2003 | Childers et al. |
| 6,550,978 B2 | | 4/2003 | De Marchi |
| 6,579,014 B2 | | 6/2003 | Melton et al. |
| 6,648,520 B2 | | 11/2003 | McDonald et al. |
| 6,669,377 B2 | * | 12/2003 | Barnes ................. G02B 6/3865 |
| | | | 385/71 |
| 6,672,774 B2 | | 1/2004 | Theuerkom et al. |
| 6,695,489 B2 | | 2/2004 | Nault |
| 6,811,321 B1 | | 11/2004 | Schmalzigaug et al. |
| 6,899,467 B2 | | 5/2005 | McDonald et al. |
| 6,902,140 B1 | | 6/2005 | Huang |
| 6,913,392 B2 | | 7/2005 | Grzegorzewska et al. |
| 6,935,789 B2 | | 8/2005 | Gross, III et al. |
| 6,945,704 B2 | | 9/2005 | Yamaguchi |
| 6,960,025 B2 | | 11/2005 | Gurreri |
| 7,090,406 B2 | | 8/2006 | Melton et al. |
| 7,147,384 B2 | | 12/2006 | Hardcastle et al. |
| 7,198,409 B2 | | 4/2007 | Smith et al. |
| 7,204,016 B2 | | 4/2007 | Roth et al. |
| 7,204,644 B2 | | 4/2007 | Barnes et al. |
| 7,226,215 B2 | | 6/2007 | Bareel et al. |
| 7,281,859 B2 | | 10/2007 | Mudd et al. |
| 7,344,317 B2 | | 3/2008 | Krowiak et al. |
| 7,357,579 B2 | | 4/2008 | Feldner |
| 7,369,738 B2 | | 5/2008 | Larson et al. |
| 7,510,335 B1 | | 3/2009 | Su et al. |
| 7,530,745 B2 | | 5/2009 | Holmquist |
| 7,572,065 B2 | | 8/2009 | Lu et al. |
| 7,574,095 B2 | | 8/2009 | Lock et al. |
| 7,614,797 B2 | | 11/2009 | Lu et al. |
| 7,614,799 B2 | | 11/2009 | Bradley et al. |
| 7,676,132 B1 | | 3/2010 | Mandry et al. |
| 7,712,974 B2 | | 5/2010 | Yazaki et al. |
| 7,744,288 B2 | | 6/2010 | Lu et al. |
| 7,775,726 B2 | | 8/2010 | Pepin et al. |
| 7,785,015 B2 | | 8/2010 | Melton et al. |
| 7,806,599 B2 | | 10/2010 | Margolin et al. |
| 7,838,775 B2 | | 11/2010 | Montena |
| 8,311,378 B2 | | 11/2012 | Niiyama et al. |
| 8,391,664 B2 | | 3/2013 | Kowalczyk et al. |
| 8,393,803 B2 | | 3/2013 | Hogue |
| 8,439,577 B2 | | 5/2013 | Jenkins |
| 8,443,488 B2 | | 5/2013 | Zhang |
| 8,480,312 B2 | | 7/2013 | Smith et al. |
| 8,548,293 B2 | | 10/2013 | Kachmar |
| 8,577,199 B2 | | 11/2013 | Pierce et al. |
| 8,647,140 B2 | | 2/2014 | Annecke |
| 8,753,022 B2 | | 6/2014 | Schroeder et al. |
| 8,821,180 B2 | | 9/2014 | Blakborn et al. |
| 9,106,003 B2 | | 8/2015 | Anderson et al. |
| 9,130,303 B2 | | 9/2015 | Anderson et al. |
| 9,182,567 B2 | | 11/2015 | Mullaney |
| 9,216,530 B2 | | 12/2015 | Vaccaro |
| 9,229,173 B2 | | 1/2016 | Yamauchi et al. |
| 9,239,441 B2 | | 1/2016 | Melton et al. |
| 9,268,102 B2 | | 2/2016 | Daems et al. |
| 9,285,559 B1 | | 3/2016 | Stockton et al. |
| 9,297,976 B2 | | 3/2016 | Hill et al. |
| 9,417,403 B2 | | 8/2016 | Mullaney et al. |
| 9,470,847 B2 | | 10/2016 | Grinderslev |
| 9,557,496 B2 | | 1/2017 | Irwin et al. |
| 9,684,138 B2 | | 6/2017 | Lu |
| 9,739,971 B2 | | 8/2017 | Eberle, Jr. et al. |
| 9,804,342 B2 | | 10/2017 | Little et al. |
| 9,829,649 B2 | | 11/2017 | Liu et al. |
| 9,910,224 B2 | | 3/2018 | Liu et al. |
| 9,939,591 B2 | | 4/2018 | Mullaney et al. |
| 9,971,104 B2 | | 5/2018 | Tong et al. |
| 10,018,797 B2 | | 7/2018 | Cheng et al. |
| 10,067,301 B2 | | 9/2018 | Murray et al. |
| 10,073,224 B2 | | 9/2018 | Tong et al. |
| 10,215,930 B2 | | 2/2019 | Mullaney et al. |
| 10,281,649 B2 | | 5/2019 | Nhep et al. |
| 10,466,425 B2 | | 11/2019 | Liu et al. |
| 10,473,867 B2 | | 11/2019 | Tong et al. |
| 10,591,678 B2 | | 3/2020 | Mullaney et al. |
| 10,613,278 B2 | | 4/2020 | Kempeneers |
| 10,620,385 B2 | | 4/2020 | Nhep et al. |
| 10,641,970 B2 | | 5/2020 | Ott et al. |
| 10,698,166 B2 | | 6/2020 | Liu et al. |
| 10,895,698 B2 | | 1/2021 | Nhep et al. |
| 10,976,500 B2 | | 4/2021 | Ott et al. |
| 11,002,917 B2 | | 5/2021 | Liu et al. |
| 11,119,283 B2 | | 9/2021 | Tong et al. |
| 11,409,051 B2 | | 8/2022 | Nhep et al. |
| 2001/0012428 A1 | | 8/2001 | Nakajima et al. |
| 2001/0014197 A1 | | 8/2001 | De Marchi |
| 2002/0076165 A1 | | 6/2002 | Childers et al. |
| 2002/0106163 A1 | | 8/2002 | Cairns |
| 2002/0139966 A1 | | 10/2002 | Griffioen et al. |
| 2002/0186934 A1 | | 12/2002 | Hug et al. |
| 2003/0063868 A1 | | 4/2003 | Fentress |
| 2003/0077045 A1 | | 4/2003 | Fleenor et al. |
| 2003/0215191 A1 | | 11/2003 | Taira et al. |
| 2003/0231839 A1 | | 12/2003 | Chen et al. |
| 2004/0023598 A1 | | 2/2004 | Zimmel et al. |
| 2004/0072454 A1 | * | 4/2004 | Nakajima ............ G02B 6/3825 |
| | | | 439/79 |
| 2004/0076389 A1 | | 4/2004 | Ozaki |
| 2004/0101254 A1 | | 5/2004 | Erdman et al. |
| 2004/0105625 A1 | | 6/2004 | Ueda et al. |
| 2004/0117981 A1 | | 6/2004 | Roth et al. |
| 2004/0165832 A1 | | 8/2004 | Bates, III et al. |
| 2004/0223699 A1 | | 11/2004 | Melton et al. |
| 2005/0084215 A1 | | 4/2005 | Grzegorzewska et al. |
| 2005/0135755 A1 | | 6/2005 | Kiani et al. |
| 2006/0093300 A1 | | 5/2006 | Marrs et al. |
| 2006/0115219 A1 | | 6/2006 | Mudd et al. |

(56) References Cited

U.S. PATENT DOCUMENTS

| | | | |
|---|---|---|---|
| 2007/0025665 A1 | 2/2007 | Dean, Jr. et al. | |
| 2007/0172173 A1 | 7/2007 | Adomeit et al. | |
| 2007/0263960 A1 | 11/2007 | Lock et al. | |
| 2007/0284146 A1 | 12/2007 | Dower et al. | |
| 2008/0011990 A1 | 1/2008 | Kostet et al. | |
| 2008/0013891 A1 | 1/2008 | Nishioka et al. | |
| 2008/0089650 A1 | 4/2008 | Legler et al. | |
| 2008/0175546 A1 | 7/2008 | Lu et al. | |
| 2008/0226234 A1 | 9/2008 | Droege | |
| 2008/0226236 A1 | 9/2008 | Pepin et al. | |
| 2008/0273855 A1 | 11/2008 | Bradley et al. | |
| 2009/0148101 A1 | 6/2009 | Lu et al. | |
| 2009/0148109 A1 | 6/2009 | Takahashi et al. | |
| 2009/0185779 A1 | 7/2009 | Gurreri et al. | |
| 2009/0290845 A1* | 11/2009 | Hoffmann | G02B 6/3869 |
| | | | 385/139 |
| 2010/0202748 A1 | 8/2010 | Pierce et al. | |
| 2011/0002586 A1 | 1/2011 | Nhep | |
| 2011/0097044 A1 | 4/2011 | Saito et al. | |
| 2011/0170829 A1 | 7/2011 | Bradley | |
| 2011/0176785 A1 | 7/2011 | Kowalczyk et al. | |
| 2011/0243506 A1 | 10/2011 | Hsu | |
| 2012/0027355 A1 | 2/2012 | LeBlanc et al. | |
| 2012/0170896 A1 | 7/2012 | Skluzacek et al. | |
| 2012/0243831 A1 | 9/2012 | Chen | |
| 2012/0257859 A1 | 10/2012 | Nhep | |
| 2013/0058615 A1 | 3/2013 | Matthew et al. | |
| 2013/0077928 A1 | 3/2013 | Hsing | |
| 2013/0094828 A1 | 4/2013 | Loeffelholz et al. | |
| 2013/0101258 A1 | 4/2013 | Tikosaka et al. | |
| 2013/0177283 A1 | 7/2013 | Theuerkorn et al. | |
| 2013/0209041 A1 | 8/2013 | Szilagyi et al. | |
| 2013/0322826 A1 | 12/2013 | Henke et al. | |
| 2014/0023326 A1 | 1/2014 | Anderson et al. | |
| 2014/0050446 A1 | 2/2014 | Chang et al. | |
| 2014/0086534 A1 | 3/2014 | Lu et al. | |
| 2014/0105542 A1* | 4/2014 | Yang | G02B 6/3888 |
| | | | 385/72 |
| 2014/0133808 A1 | 5/2014 | Hill et al. | |
| 2014/0153878 A1 | 6/2014 | Mullaney | |
| 2014/0219621 A1 | 8/2014 | Barette, Jr. et al. | |
| 2014/0235091 A1 | 8/2014 | Wang et al. | |
| 2014/0295700 A1 | 10/2014 | Natoli et al. | |
| 2015/0017827 A1 | 1/2015 | Vaccaro | |
| 2015/0136439 A1 | 5/2015 | Vaccaro | |
| 2015/0168657 A1 | 6/2015 | Islam | |
| 2015/0268434 A1 | 9/2015 | Barnette, Jr. et al. | |
| 2015/0338582 A1 | 11/2015 | Halls et al. | |
| 2016/0187590 A1 | 6/2016 | Lu | |
| 2016/0306122 A1 | 10/2016 | Tong et al. | |
| 2016/0349458 A1 | 12/2016 | Murray et al. | |
| 2016/0356963 A1 | 12/2016 | Liu et al. | |
| 2016/0356964 A1 | 12/2016 | Liu et al. | |
| 2017/0131509 A1 | 5/2017 | Xiao et al. | |
| 2018/0106972 A1 | 4/2018 | Liu et al. | |
| 2018/0224608 A1 | 8/2018 | Liu et al. | |
| 2018/0348447 A1 | 12/2018 | Nhep et al. | |
| 2019/0137698 A1 | 5/2019 | Wang et al. | |
| 2020/0012062 A1* | 1/2020 | Kirkpatrick | G02B 6/52 |
| 2020/0088951 A1 | 3/2020 | Liu et al. | |
| 2020/0284991 A1 | 9/2020 | Mullaney et al. | |
| 2020/0355876 A1 | 11/2020 | Liu et al. | |
| 2020/0400897 A1* | 12/2020 | Hu | G02B 6/3894 |
| 2021/0286137 A1 | 9/2021 | Ott et al. | |
| 2021/0333478 A1 | 10/2021 | Liu et al. | |
| 2022/0365290 A1* | 11/2022 | Shikama | G02B 6/3886 |
| 2022/0390702 A1* | 12/2022 | Buddington | G02B 6/4458 |
| 2024/0159975 A1* | 5/2024 | Diepstraten | G02B 6/3861 |

FOREIGN PATENT DOCUMENTS

| | | | |
|---|---|---|---|
| CN | 101084460 A | | 12/2007 |
| CN | 101084461 A | | 12/2007 |
| CN | 201527493 U | | 7/2010 |
| CN | 201926781 U | | 8/2011 |
| CN | 102313934 A | | 1/2012 |
| CN | 102360104 A | | 2/2012 |
| CN | 102460259 A | | 5/2012 |
| CN | 202583527 U | | 12/2012 |
| CN | 101377558 B | | 2/2013 |
| CN | 202815276 U | | 3/2013 |
| CN | 202956505 U | | 5/2013 |
| CN | 203054267 U | | 7/2013 |
| CN | 103353635 A | | 10/2013 |
| CN | 103718392 A | | 4/2014 |
| CN | 203688854 U | | 7/2014 |
| CN | 203786340 U | | 8/2014 |
| CN | 203825243 U | | 9/2014 |
| CN | 105093420 A | | 11/2015 |
| CN | 105093421 A | | 11/2015 |
| EP | 0 330 399 A1 | | 8/1989 |
| EP | 0 429 398 A2 | | 5/1991 |
| EP | 2 128 675 A1 | | 12/2009 |
| EP | 2 355 286 A1 | | 8/2011 |
| EP | 2 482 109 A1 | | 8/2012 |
| EP | 2 031 719 B1 | | 1/2013 |
| GB | 2 509 532 A | | 7/2014 |
| JP | 8-43687 A | * | 2/1996 |
| JP | 2001-147344 A | | 5/2001 |
| JP | 2004-126371 A | | 4/2004 |
| JP | 2006-106160 A | * | 4/2006 |
| JP | 2007-165235 A | | 6/2007 |
| JP | 2008-152266 A | | 7/2008 |
| JP | 2014-63111 A | * | 4/2014 |
| KR | 10-2601966 B1 | * | 11/2023 |
| WO | 00/13052 A1 | | 3/2000 |
| WO | 01/40839 A1 | | 6/2001 |
| WO | 02/052310 A2 | | 7/2002 |
| WO | 2006/069092 A2 | | 6/2006 |
| WO | 2006/069093 A1 | | 6/2006 |
| WO | 2008/091720 A1 | | 7/2008 |
| WO | 2010/118031 A1 | | 10/2010 |
| WO | 2011/092084 A2 | | 8/2011 |
| WO | 2012/037727 A1 | | 3/2012 |
| WO | 2012/125836 A2 | | 9/2012 |
| WO | 2013/077969 A1 | | 5/2013 |
| WO | 2013/126429 A2 | | 8/2013 |
| WO | WO 2014/036781 A1 | * | 3/2014 |
| WO | 2015/028433 A1 | | 3/2015 |
| WO | 2015/144883 A1 | | 10/2015 |
| WO | 2017/106507 A1 | | 6/2017 |
| WO | 2017/106514 A1 | | 6/2017 |
| WO | 2018/146470 A1 | | 8/2018 |
| WO | 2018/209253 A2 | | 11/2018 |

OTHER PUBLICATIONS

Dodds, "Introducing QWKconnect from Emtelle," https://www.cablejoints.co.uk/blog/article/introducing-qwkconnect-from-emtelle, 6 pages (Oct. 26, 2016).

Fibretap Technical Overview, The Ultimate Plug & Play Ruggedised Drop Solution, 8 pages, admitted as prior art as of May 13, 2020.

Extended European search report dated Apr. 16, 2024 from corresponding EP Appln. No. 21805053.2 (8 pgs.).

Brochure, "Miniflex® Fiber Cable—QuikPush®," PPC A Belden Brand, 3 pages (publicly available at least as early as Feb. 13, 2020).

* cited by examiner

*FIG. 20*

INSTALLING AN OPTICAL FIBER

CROSS-REFERENCE TO RELATED APPLICATION

This application is a National Stage Application of PCT/US2021/032284, filed on 13 May 2021, which claims the benefit of U.S. Patent Application Ser. No. 63/024,151, filed on May 13, 2020, the disclosures of which are incorporated herein by reference in their entireties.

BACKGROUND

Fiber optic communication systems are becoming prevalent in part because service providers want to deliver high bandwidth communication capabilities (e.g., data invoice) to customers. Optical fiber connectors are an important part of most fiber optic communication systems. A typical fiber optic connector includes a ferrule assembly supported at a distal end of a connector housing. The ferrule has a distal end face at which a polished end of the optical fiber is located. When two fiber optic connectors are interconnected, the distal end faces of the ferrules abut one another and align the polished ends of the optical fibers. A spring may be used to bias the ferrule assembly in a distal direction relative to the connector housing (i.e., towards the other connector).

SUMMARY

Some aspects of the disclosure are directed to a method for installing an optical cable at an end user premises (e.g., a home, an apartment unit, an office, a store, etc.). A cable terminated at a connector core is pushed through a duct or other pathway. The connector core includes a ferrule, a spring, and a core housing retaining the spring at the ferrule. The connector core has a maximum cross-dimension of no more than about 5 mm. Upon reaching its destination, the connector core is inserted into and secured to a plug body without any intermediate steps performed by the user.

In certain implementations, a pushing cap is mounted over a ferrule of the connector core. In certain examples, the pushing cap remains on the connector core as the connector core is inserted into the ferrule. The pushing cap functions as a dust cap for the ferrule while the cable is not in use (e.g., is not plugged into an adapter port or into a female connector).

In certain implementations, the connector core includes deflectable latching arms that snap into detents or over catch surfaces within the plug body to secure the connector core to the plug body. In certain examples, a core sleeve is carried with the connector core to selectively cover the latching arms. The core sleeve holds the latching arms in an inwardly deflected position until the connector core is inserted into the plug body. The core sleeve moves to release the latch arms to enable the connector core to latch to the plug body. In certain implementations, the core sleeve moves when entrained by a portion of the plug body during insertion.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 20 is a cross-sectional view of the connectorized cable assembly of FIG. 18 shown assembled.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
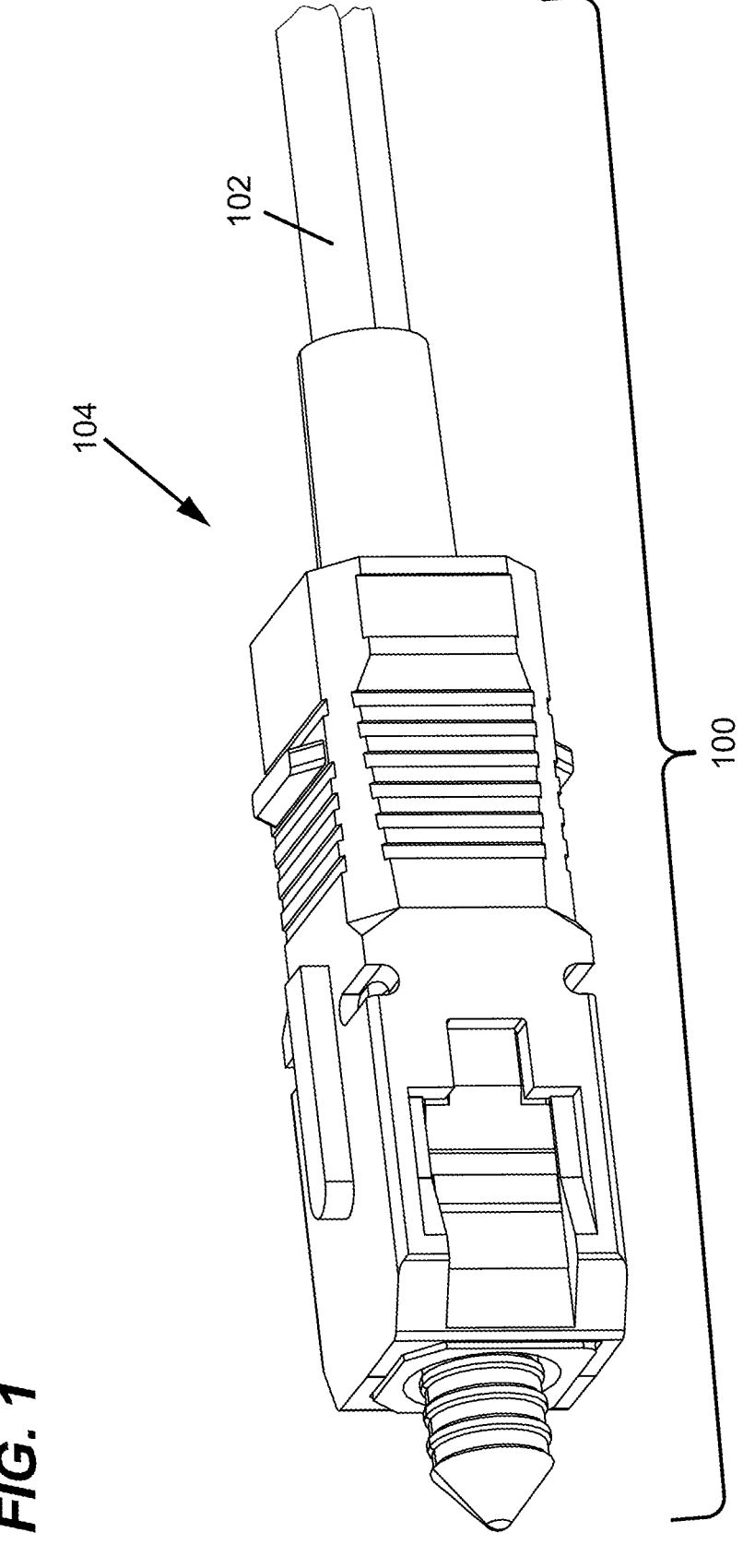
FIG. 1 is a perspective view of an example connectorized cable assembly including a plug body mounted over a connector core to form a plug connector terminating an optical cable.
Figure 17:
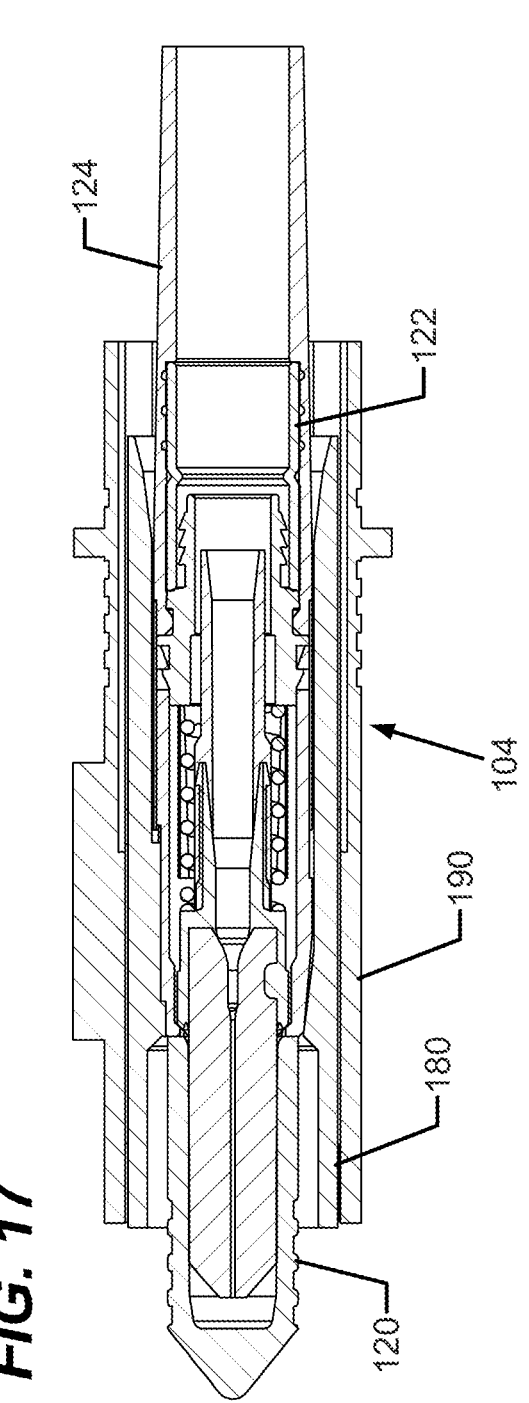
FIG. 17 is a cross-sectional view of the connectorized cable assembly of FIG. 15 shown assembled.
Figure 18:
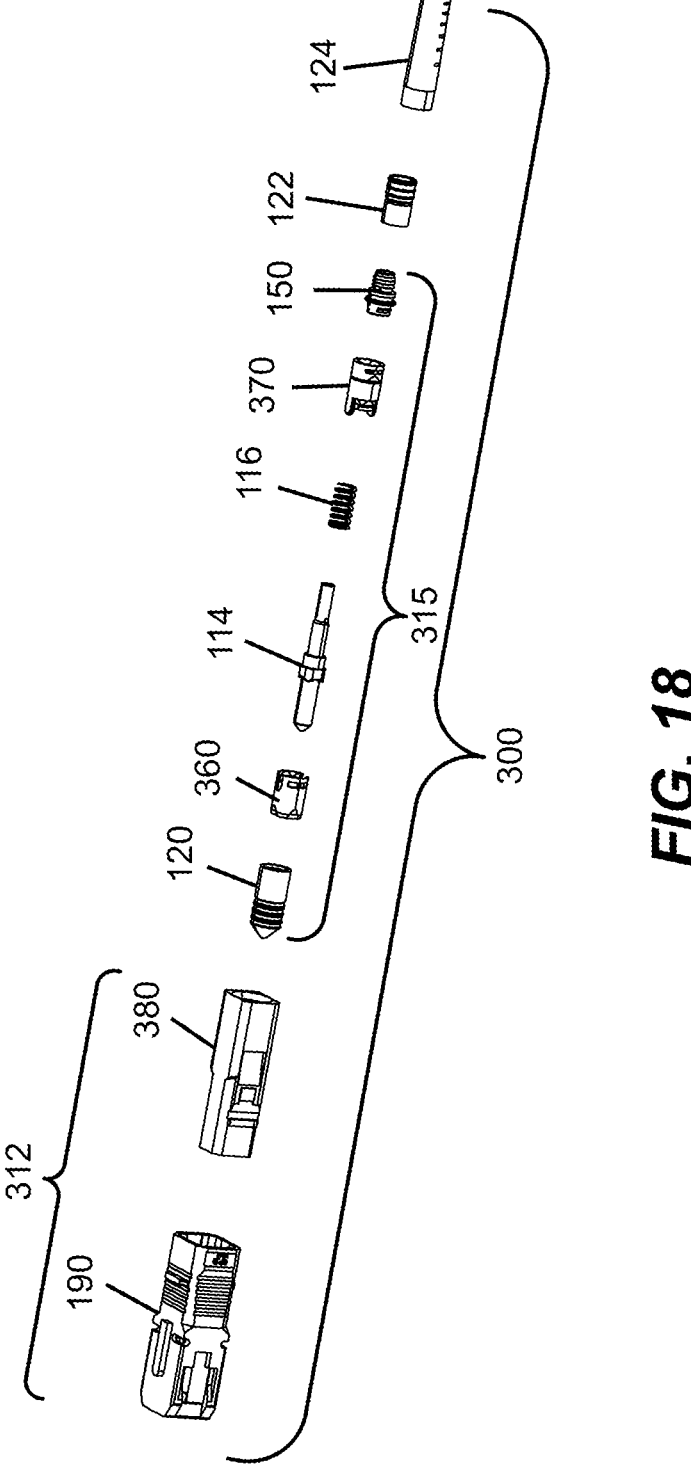
FIG. 18 is a perspective view of another example connectorized cable assembly with the components exploded from each other for ease in viewing.
Figure 19:
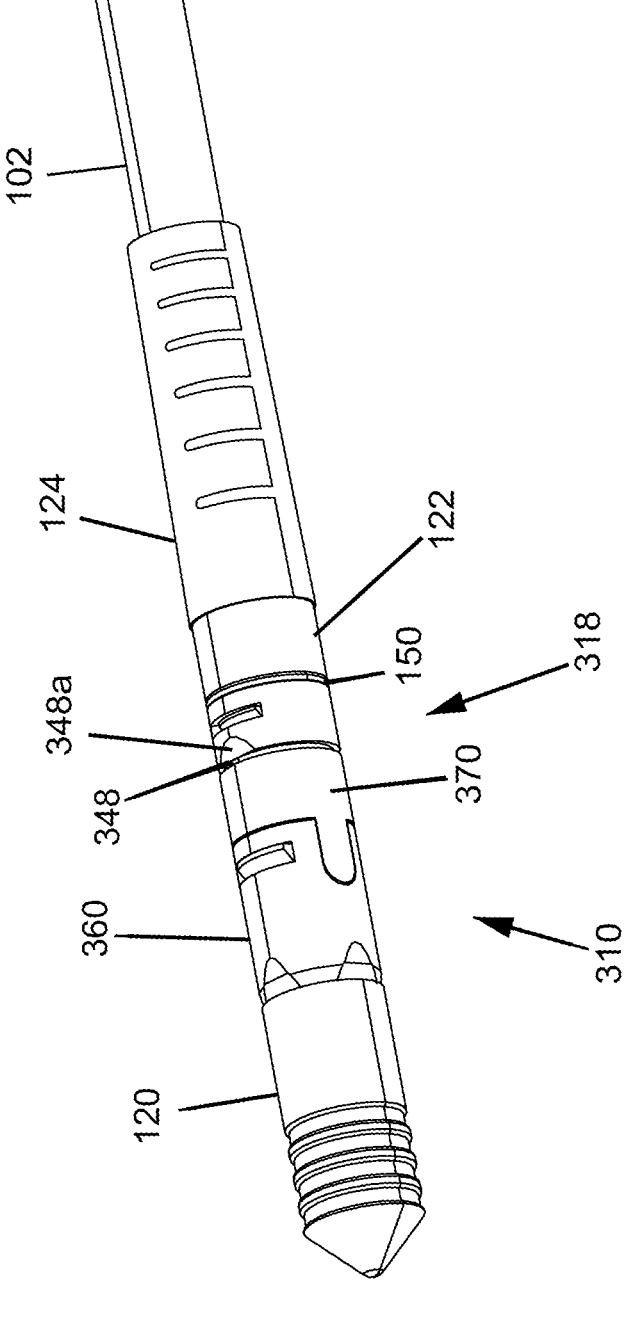
FIG. 19 is a perspective view of an example connector core of the cable assembly of FIG. 18.
Figure 20:
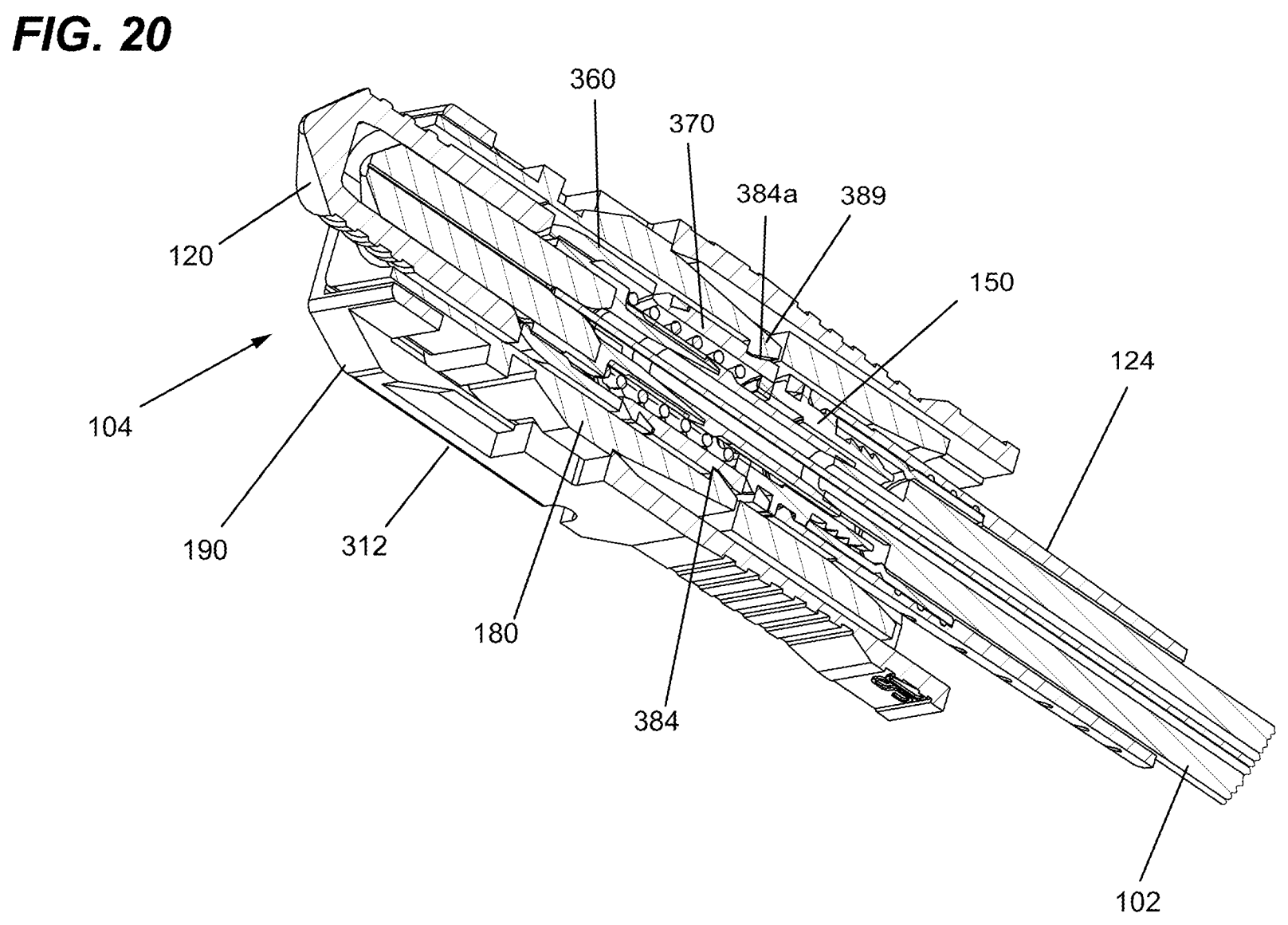

The present disclosure is directed to a process for installing a connectorized cable assembly 100, 200, 300 at an installation site. For example, the connectorized cable assembly 100, 200, 300 can be installed at the premises of an end user (e.g., at a house, at a unit in a multi-dwelling building, at an office, at a store, etc.). Connectorizing the end 106 of the cable 102 with a plug connector 104 (e.g., see FIGS. 1, 17, and 20) facilitates optically connecting the connectorized cable assembly 100 with equipment at the installation site (e.g., with an optical-to-electrical converter). In certain implementations, at least part of the plug connector 104 is installed on the optical cable 102 at a factory or assembly center while another portion of the plug connector 104 is assembled at the installation site. For example, a connector core 110, 210, 310 may be assembled at the factory while a plug body 112, 312 may be assembled over the connector core 110, 210, 310 at the installation site to fully assemble the plug connector 104. Alternatively, the connector core 110, 210, 310 may be connected at the installation site without further assembly.

Figure 2:
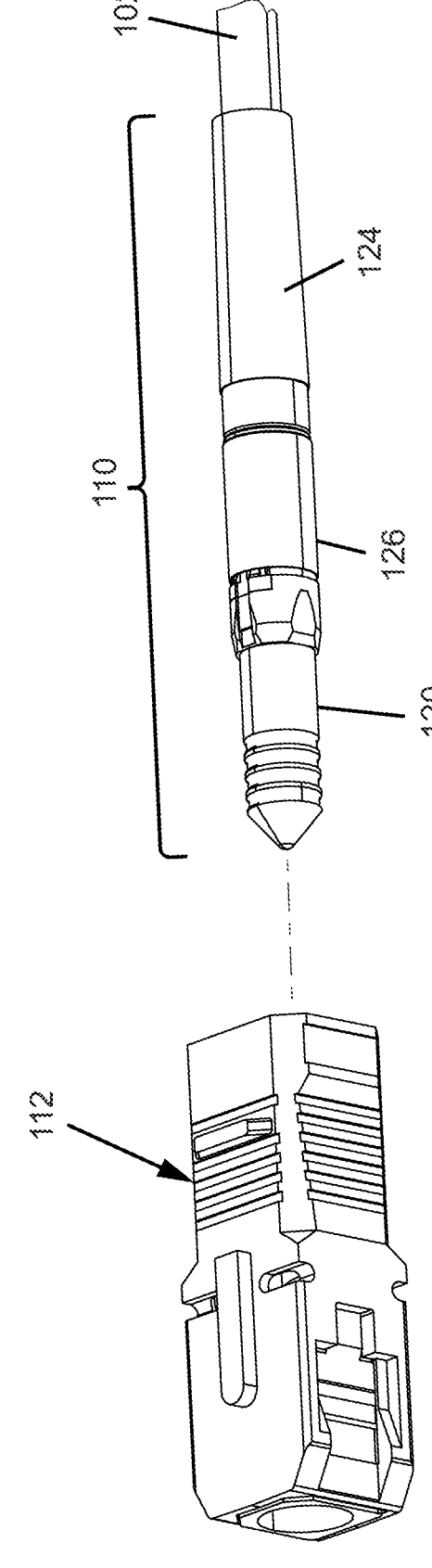
FIG. 2 shows the plug body exploded forwardly of the connector core.
Figure 3:
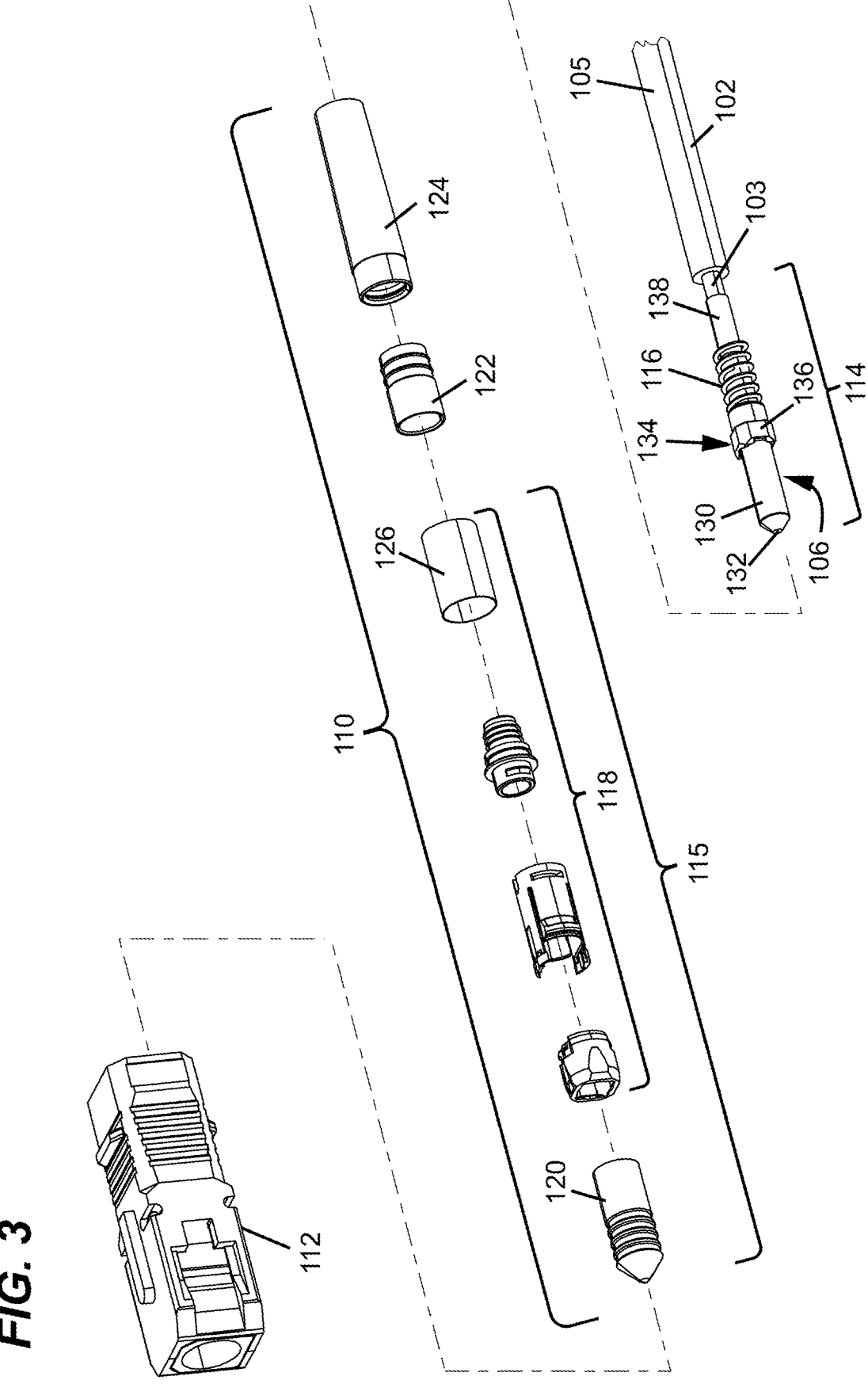
FIG. 3 is an exploded view of the connectorized cable assembly of FIG. 1.

In general, an end 106 of an optical cable 102 is terminated at the connector core 110, 210, 310 (e.g., see FIGS. 2 and 16) in a factory or assembly center. The optical cable 102 with the connector core 110, 210, 310 and without the plug body 112, 312 is pushed along a duct or other path from a first location to a second location at the installation site. For example, the connector core 110, 210, 310 may be pushed through a wall from an exterior of an end user premises to an interior of the end user premises. The plug body 112, 312 may be assembled over the connector core 110, 210, 310 at the second location to form a connectorized cable assembly 100, 200, 300. In certain implementations, the connector core 110, 210, 310 is pushed into the plug body 112, 312 without performing any intermediate assembly steps on the connector core 110, 210, 310.

In certain implementations, the connector core 110, 210, 310 has a maximum outer cross-dimension (e.g., diameter) of no more than 5 mm to fit through the path. In certain examples, the maximum outer cross-dimension of the connector core 110, 210, 310 is no more than 4.8 mm. In certain examples, the maximum outer cross-dimension of the connector core 110, 210, 310 is no more than 4.5 mm.

The optical cable 102 includes one or more optical fibers 103 surrounded by a cable jacket 105. In some examples, the optical cable 102 is a single-fiber cable; and the plug connector 104 is a single-fiber plug connector. In other examples, the optical cable 102 is a multi-fiber cable; and the plug connector is a multi-fiber plug connector. In certain examples, the optical cable 102 also includes strength members (e.g., aramid yarns) to provide tensile strength to the fiber. In some such examples, the strength members are disposed between the jacket 105 and the fiber(s) 103. In other such examples, the strength members are embedded in the jacket 105.

In certain implementations, the connector core 110, 210, 310 includes a ferrule assembly 114; a spring 116; and a protective arrangement 115, 215, 315 that at least partially surrounds the spring 116 and ferrule assembly 114. In certain implementations, the connector core 110, 210, 310 also includes a cable anchor member 122 (e.g., a crimp sleeve) with which strength members of the cable 102 are secured to the connector core 110, 210, 310 (e.g., at a rear of the connector core 110, 210, 310). In certain implementations, the connector core 110, 210, 310 also includes a strain relief boot 124 to protect the cable 102 extending rearwardly from the connector core 110, 210, 310.

Figure 4:
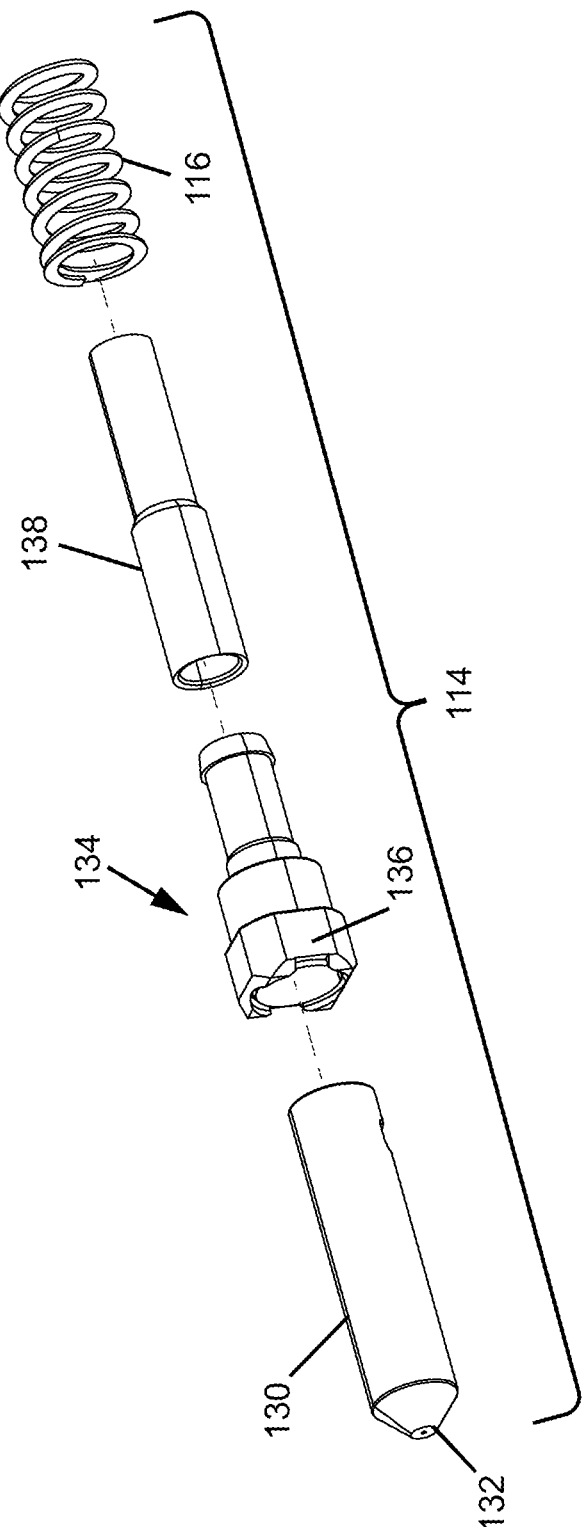
FIG. 4 is an exploded view of an example ferrule assembly for use with the connector core of FIG. 2.

FIG. 4 illustrates an example ferrule assembly 114 suitable for use with the connector core 110 disclosed herein. The ferrule assembly 114 includes an optical ferrule 130 that supports the one or more optical fibers 103 and a ferrule hub 134 mounted about a rear of the optical ferrule 130. The ferrule 130 extends forwardly from the ferrule hub 134 to a front end face 132 at which an end of the optical fiber 103 is accessible. In certain implementations, the ferrule hub 134 defines flat faces 136 to facilitate tuning of the optical cable 102. In certain implementations, the ferrule assembly 114 includes an epoxy tube 138 that extends rearwardly from the ferrule hub 134. In certain implementations, the spring 116 is a coil spring that mounts over the rear of the ferrule hub 134 and/or over the epoxy tube 138.

In certain implementations, the protective arrangement 115, 215, 315 of the connector core 110, 210, 310 includes a core housing 118, 218, 318 that surrounds the spring 116 and at least a portion of the ferrule assembly 114. The protective arrangement 115, 215, 315 also includes a pushing cap 120 that mounts over the ferrule 130 to cover the end face 132 of the ferrule 130. The pushing cap 120 protects the ferrule 130 while the connector core 110, 210, 310 is being pushed through the duct or other path. The pushing cap 120 is detachable from the ferrule 130 to provide access to the optical fiber(s) 103 while the core housing 118, 218, 318 continues to surround the spring 116 and the at least a portion of the ferrule assembly 114. In certain examples, the pushing cap 120 functions as a dust cap for the ferrule 130 after the plug body 112, 312 is mounted to the connector core 110, 210, 310 and before the pushing cap 120 is detached from the ferrule 103.

The pushing cap 120 has a closed end opposite an open end. The ferrule 130 enters the pushing cap 120 through the open end. The end face 132 of the ferrule 130 faces the closed end. In certain implementations, the pushing cap 120 is friction fit to the ferrule 130. In certain implementations, the pushing cap 120 extend over a majority of a length of the ferrule 130. In certain implementations, the pushing cap 120 abuts a front of the core housing 118, 218, 318. In certain implementations, the pushing cap 120 mechanically engages the core housing 118, 218, 318 (e.g., fits within a groove or recess at the front of the core housing 118, 218, 318). In certain examples, the pushing cap 120 includes ribs, grooves, or otherwise defines a gripping surface to facilitate removing the pushing cap 120 from the ferrule 130.

The protective arrangement 115, 215, 315 extends between opposite first and second axial ends 140, 142. The pushing cap 120 defines the first axial end 140. The core housing 118, 218, 318 defines the second axial end 142. The second axial end 142 defines a cable anchor location 144 at which the jacket 105 and/or strength members of the cable 102 are secured (e.g., using adhesive, a crimp sleeve, or other attachment technique). The ferrule 130 extends beyond the first axial end 140 of the core housing 118, 218, 318. In certain examples, the first axial end 140 defines an opening 146 sized and shaped to receive a tuning key configured to engage the ferrule hub 134.

In certain implementations, the core housing 118, 218, 318 is configured to fit with an interior profile of the plug body 112, 312 to secure the core housing 118, 218, 318 within the plug body 112, 312. The plug body 112, 312 defines an interior passage 181 that tapers inwardly (e.g., see 183 in FIG. 6) towards a front end of the plug body 112, 312. In certain examples, the plug body 112, 312 also includes a rearward-facing stop surface 185. The tapered surface 183 and stop surface 185 abut the first axial end 140 of the core housing 118, 218, 312. Accordingly, during assembly, the connector core 110, 210, 310 is inserted through a rear of the plug body 112, 312 and passes through the passage 181 of the plug body 112, 312 until the core housing 118, 218, 318 abuts the tapered surface 183 and stop surface 185. The tapered surface 183 and stop surface 185 inhibit continued forward movement of the connector core 110, 210, 310 through the passage 181.

Figure 5:
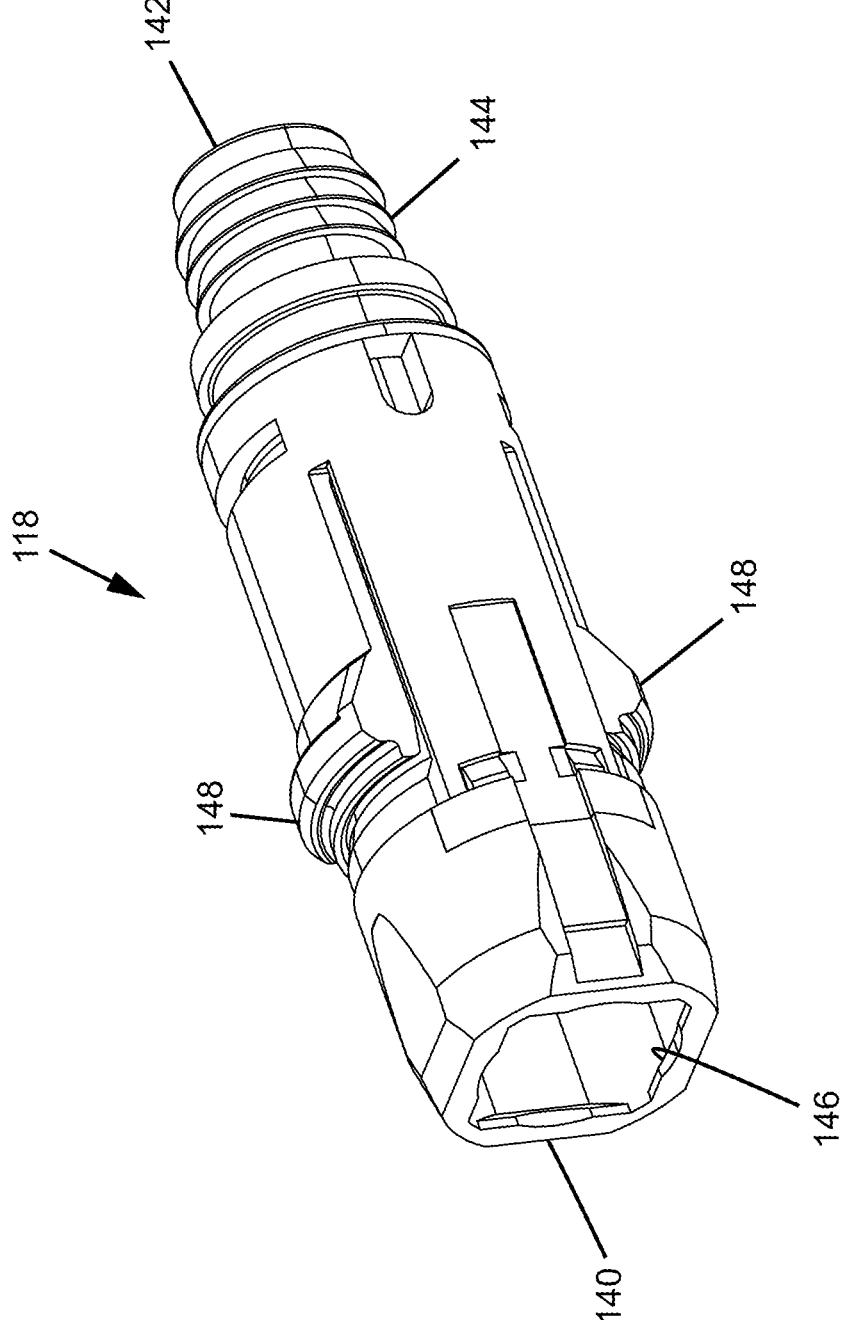
FIG. 5 is a perspective view of an example assembled core housing suitable for use with the connector core shown in FIG. 2, the core housing being shown separate from a cable and ferrule assembly for ease in viewing.
Figure 7:
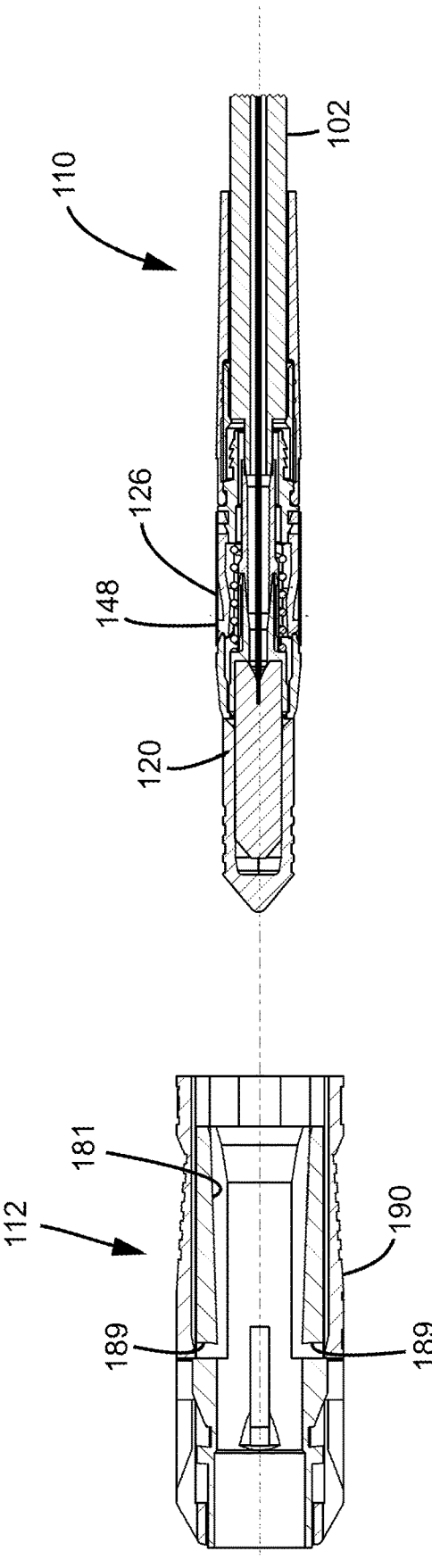
FIG. 7 shows the connector core and plug housing of FIG. 6 rotated 90 degrees.
Figure 15:
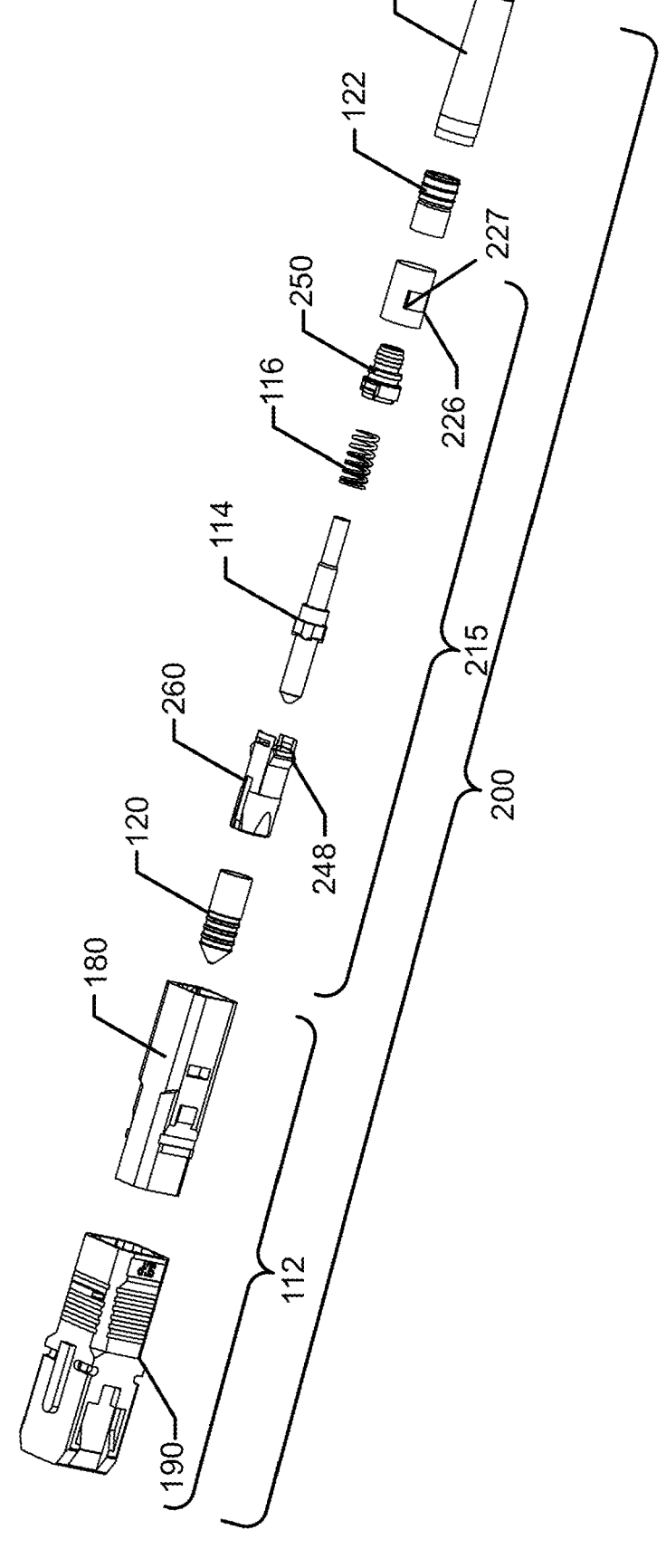
FIG. 15 is a perspective view of another example connectorized cable assembly with the components exploded from each other for ease in viewing.

In certain implementations, the core housing 118, 218, 318 includes a first part 148, 248, 348 of a latching arrangement (e.g., see FIGS. 5 and 15). A plug body 112, 312 that mounts over the connector core 110, 210, 310 includes a second part 189, 389 of the latching arrangement within an interior of the plug body 112, 312 (e.g., see FIGS. 7, 17, and 20). The second part 189, 389 of the latching arrangement engages the first part 148, 248, 348 of the latching arrangement to inhibit rearward movement of the connector core 110, 210, 31 back out of the plug body 112, 312. In some implementations, the first part 148, 248 of the latching arrangement includes radially deflectable latch arms that are biased outwards. In such implementations, the second part 189 of the latching arrangement includes catch surfaces that engage with the latch arms. In other implementations, the first part 348 can include catch surfaces that receive deflectable latch arms of the second part 389. In the example depicted in FIG. 20, the first part 348 also defines tapered recess 348*a* leading to the catch surface 348 to accommodate the latch arm 389.

Figure 8:
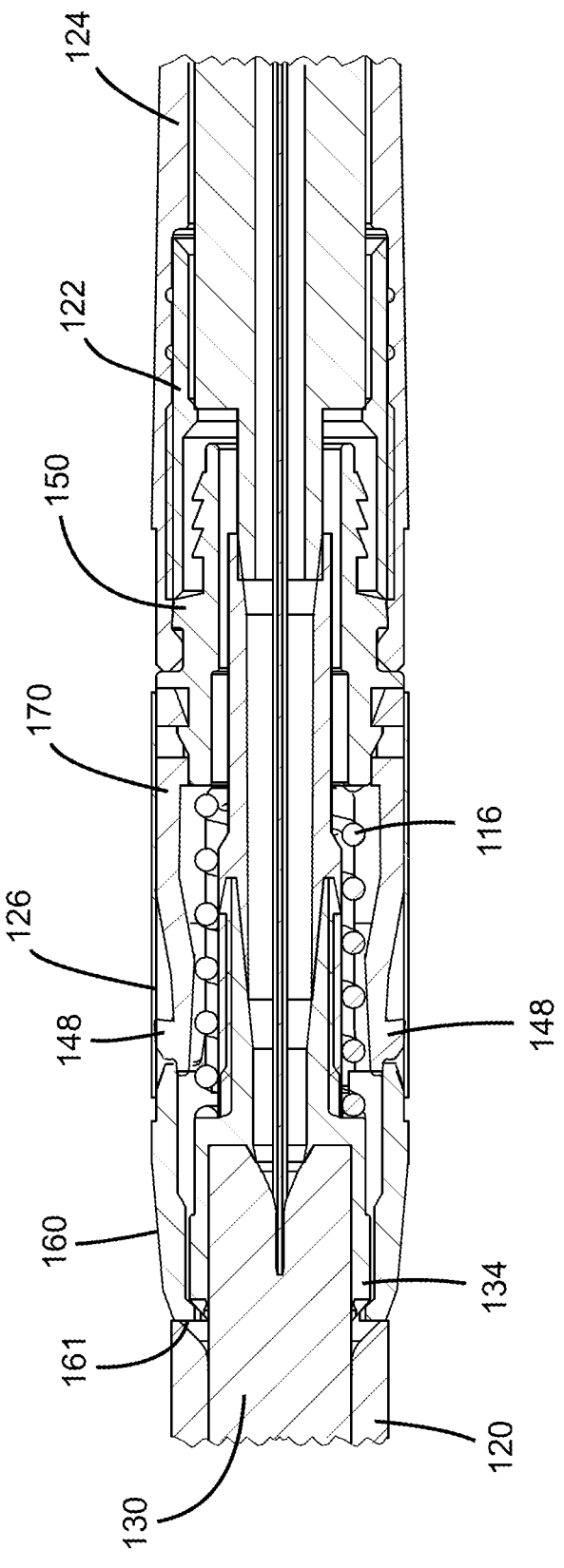
FIG. 8 is an enlarged view of a portion of FIG. 7.
Figure 9:
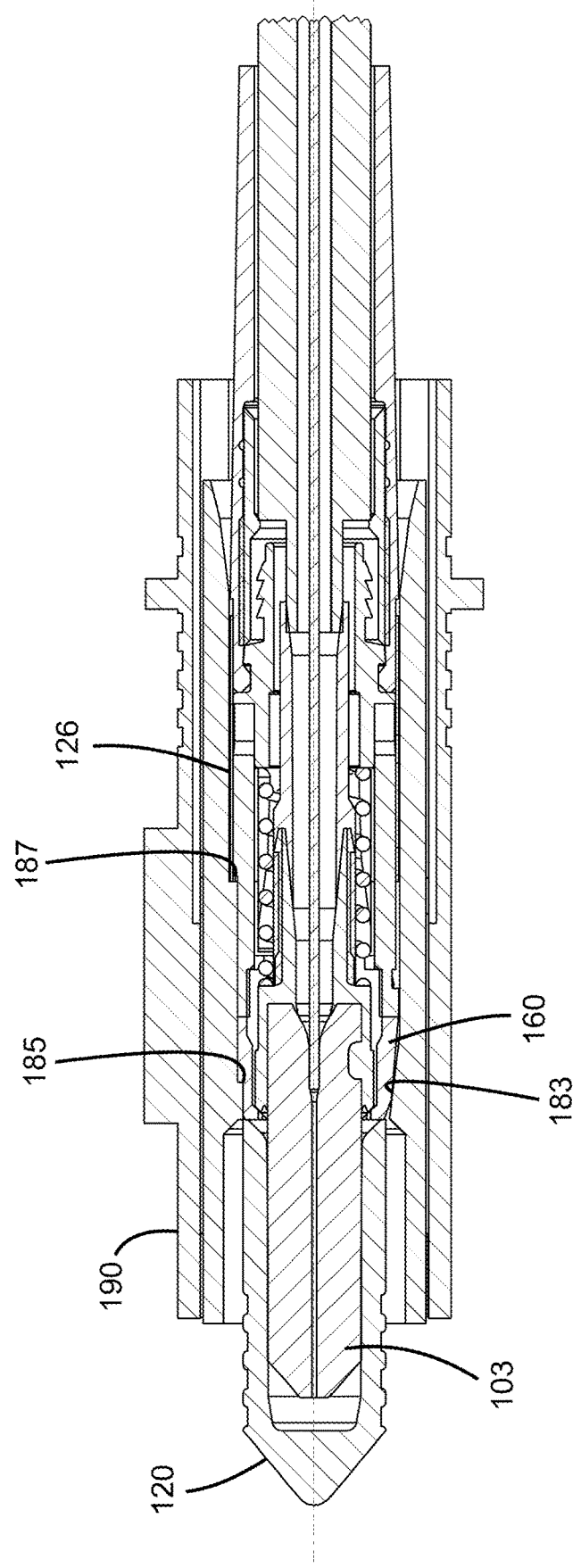
FIG. 9 shows the connector core of FIG. 6 disposed within the plug body.
Figure 10:
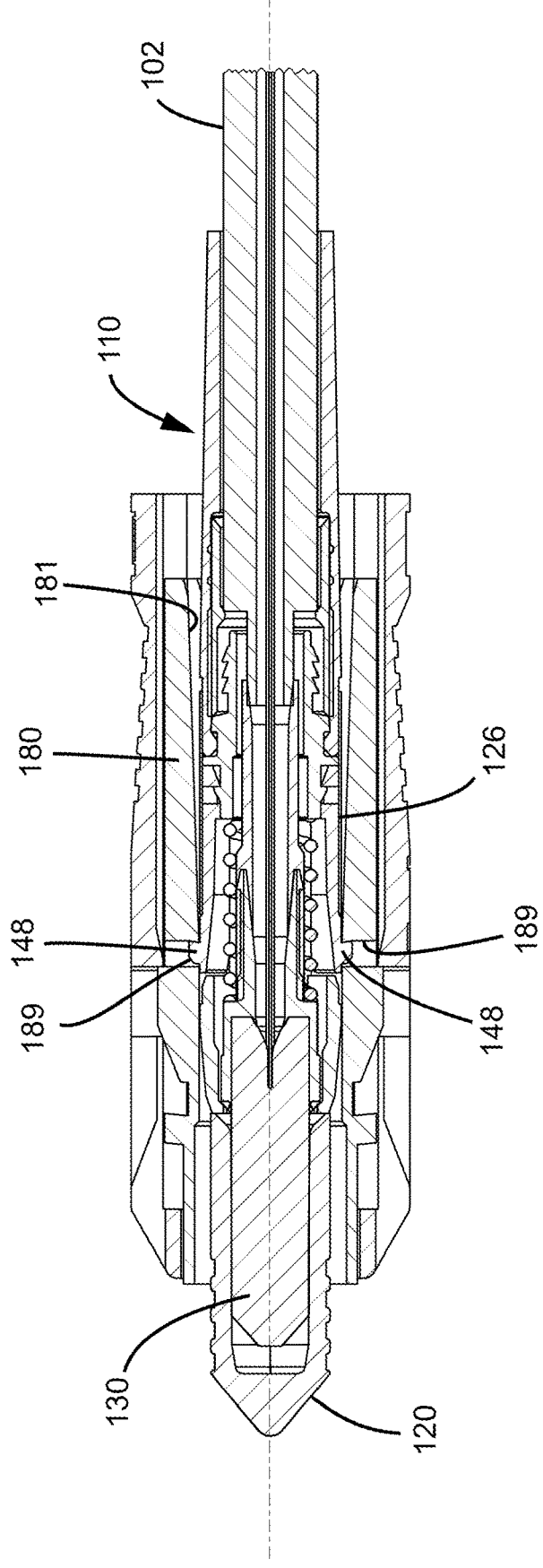
FIG. 10 shows the connector core of FIG. 7 disposed within the plug body.
Figure 11:
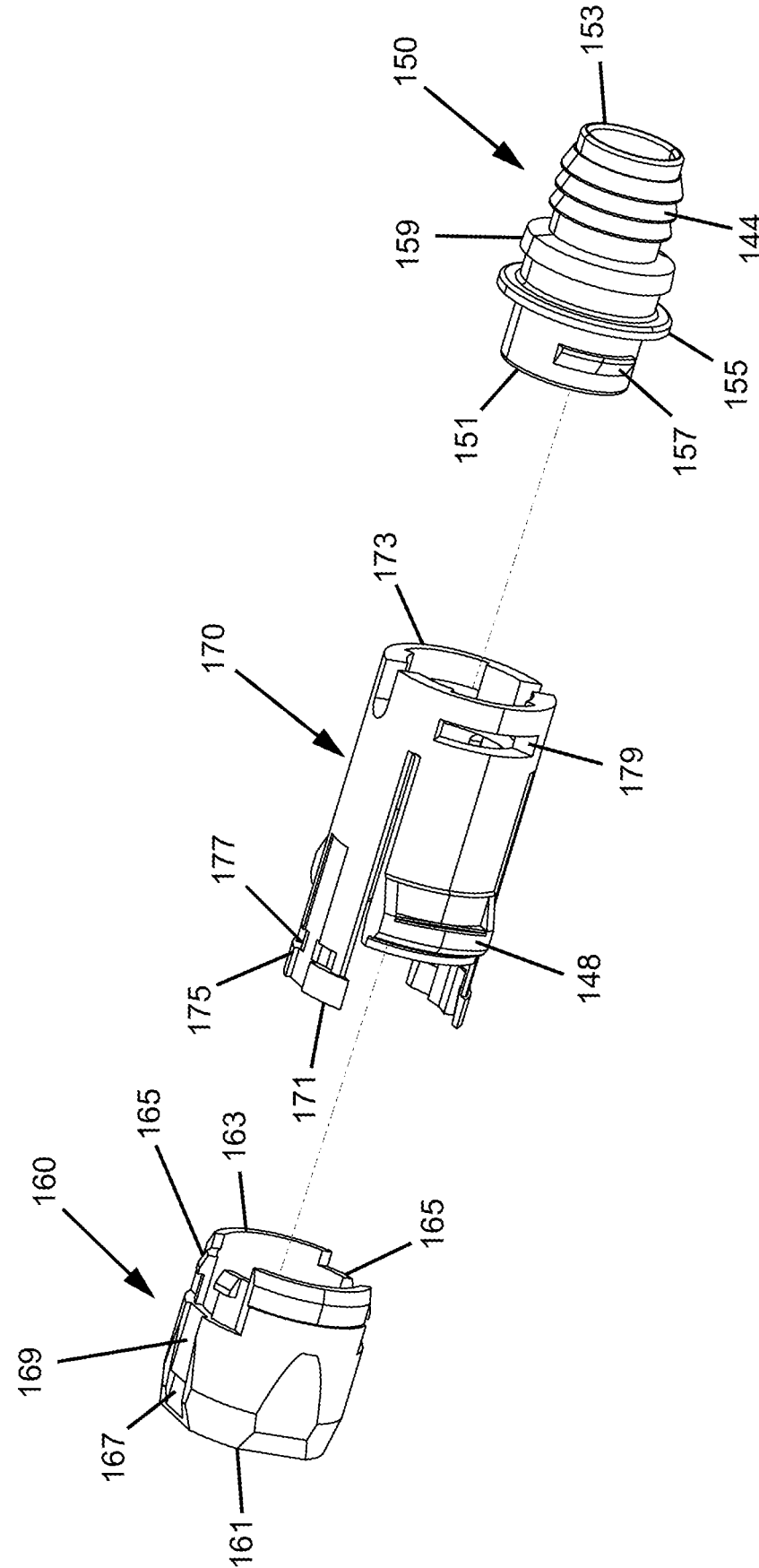
FIG. 11 is a perspective view of the core housing of FIG. 5 including a front housing shown exploded from an intermediate housing, which is shown exploded from a rear housing.
Figure 16:
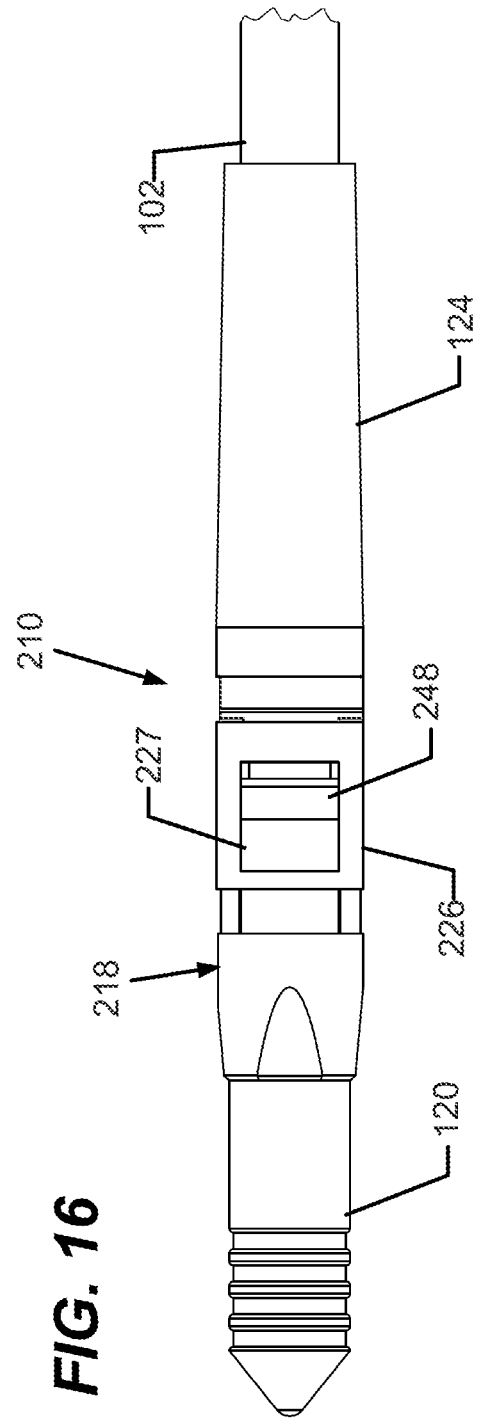
FIG. 16 is a side elevational view of an example connector core of the cable assembly of FIG. 15.

In certain implementations, the core housing 118, 218 carries a core sleeve 126, 226 that is movable (e.g., axially slidable) relative to the core housing 118, 218 between a traveling position (e.g., FIG. 8) and an assembled position (e.g., FIGS. 10 and 16). When in the traveling position, the core sleeve 126, 226 covers the first part 148, 248 of the latching arrangement. For example, the core sleeve 126, 226 may hold the latch arms 148, 248 in a radially inwardly deflected configuration when the core sleeve 126, 226 covers the first part 148, 248 of the latching arrangement.

The core sleeve 126, 226 provides access to the first part 148, 248 of the latching arrangement when disposed in the assembled position. For example, the core sleeve 126, 226 may slide rearward to expose the latch arms 148, 248 sufficient to enable outward radial deflection of the latch arms 148, 248. In some examples, the core sleeve 226 may define apertures 227 that align with the latch arms 248 sufficient to allow the latch arms 248 to extend through the apertures 227 when the core sleeve 226 is disposed in the assembled position (see FIG. 16). In other examples, the core sleeve 126 is devoid of apertures. In such examples, the core sleeve 126 moves a sufficient distance relative to the core housing 118 between the traveling and assembled positions to no longer overlap the latch arms 148 when disposed in the assembled position (see FIG. 10).

Figure 6:
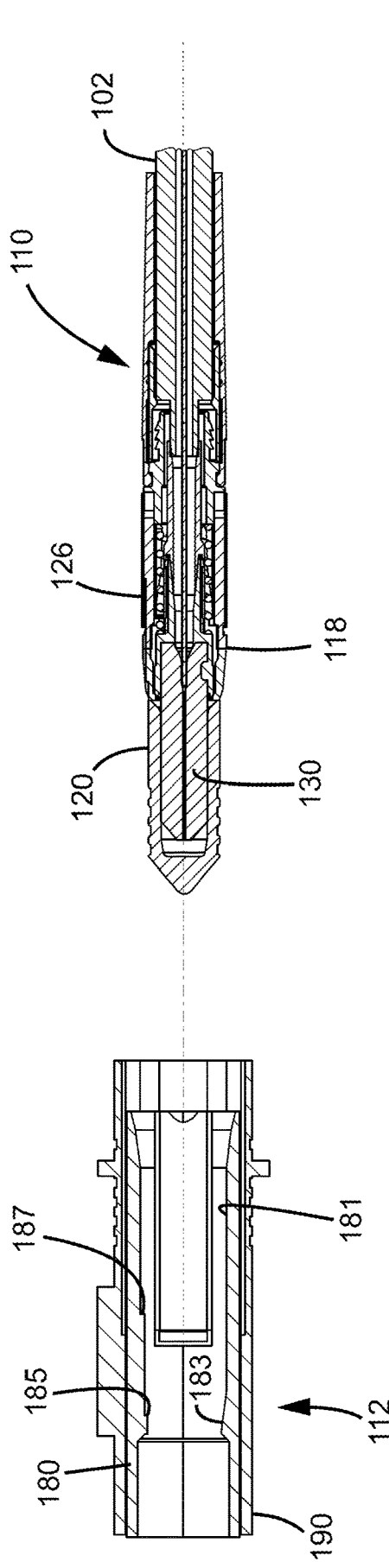
FIG. 6 is a cross-sectional view of the connector core and plug housing of FIG. 2 showing a core sleeve in a traveling position relative to a core housing of the connector core.

In certain implementations, the core sleeve 126, 226 is transitioned from the traveling position to the assembled position when the connector core 110, 210 is inserted into the plug body 112. For example, as shown in FIG. 6, the interior of the plug body 112 also includes an entrainment member 187 within the passage 181. The entrainment member 187 is positioned so that the entrainment member 187 catches the core sleeve 126, 226 as the connector core 110, 210 passes through the plug body passage 181. The engagement between the entrainment member 187 and the core sleeve 126, 226 moves the core sleeve 126, 226 from the traveling position to the assembled position as the connector core 110, 210 is pushed fully into the plug body 112. Moving the core sleeve 126, 226 to the assembled position frees the latch arms 148, 248 of the connector core 110, 210 to engage catch surfaces 189 within the passage 181.

In some implementations, the plug body 112, 312 is a single-piece body. In other implementations, the plug body 112, 312 is a multi-piece body. In certain examples, the pieces of the plug body 112, 312 are assembled prior to insertion of the connector core 110, 210, 310 into the plug body 112, 312. For example, the plug body 112, 312 may include an outer body 190 that mounts over an inner body 180, 380. The inner body 180, 380 defines the passage 181 and interior features (e.g., the entrainment member 187, the stop surface 185, the second part 189, 389 of the latching arrangement). In certain examples, the outer body 190 defines the attachment interface (e.g., latching, keying, etc.) for the plug connector 104. In the example shown, the plug body 112, 312 provides an SC connection interface. In other examples, the plug body 112, 312 can provide an LC connection interface, an MPO connection interface, etc.

During installation, the connector core 110, 210, 310 may be pushed through a duct or other path. In certain implementations, the connector core 110, 210 is pushed while the core sleeve 126, 226 is disposed in the traveling position. Accordingly, the core sleeve 126, 226 inhibits the latch arms 148, 248 from catching on surfaces along the path. Upon exiting the duct or other path, the connector core 110, 210, 310 is inserted into the plug body 112, 312; the connector core 110, 210, 310 latches to the plug body 112, 312 when the connector core 110, 210, 310 is correctly aligned with the plug body 112, 312. In certain implementations, during insertion, the core sleeve 126, 226 is automatically moved to the assembled position by the entrainment member 187 without the user directly manipulating the core sleeve 126, 226. In certain examples, the connector core 110, 210, 310 is keyed to the plug body 112, 312, as will be discussed in more detail herein, so that the connector core 110, 210, 310 can be inserted into the plug body 112, 312 in only one rotational orientation.

Referring now to FIGS. 11-14, an example implementation of the core housing 118, 218, 318 is shown. The core housing 118, 218, 318 includes a rear housing 150, 250 to which the cable 102 is anchored and a front housing 160, 260, 360 that couples to the rear housing 150, 250 to sandwich the ferrule assembly 114 and spring 116 therebetween. In some implementations, the front housing 260 couples directly to the rear housing 250 to partially surround the ferrule assembly 114 and spring 116. In such examples, the front housing 260 may define the first part 248 of the latching arrangement. In other implementations, an intermediate housing 170, 370 couples the rear and front housings 150, 160, 360 together as will be described herein. In such examples, the intermediate housing 170, 370 may define the first part 148, 348 of the latching arrangement.

Figure 12:
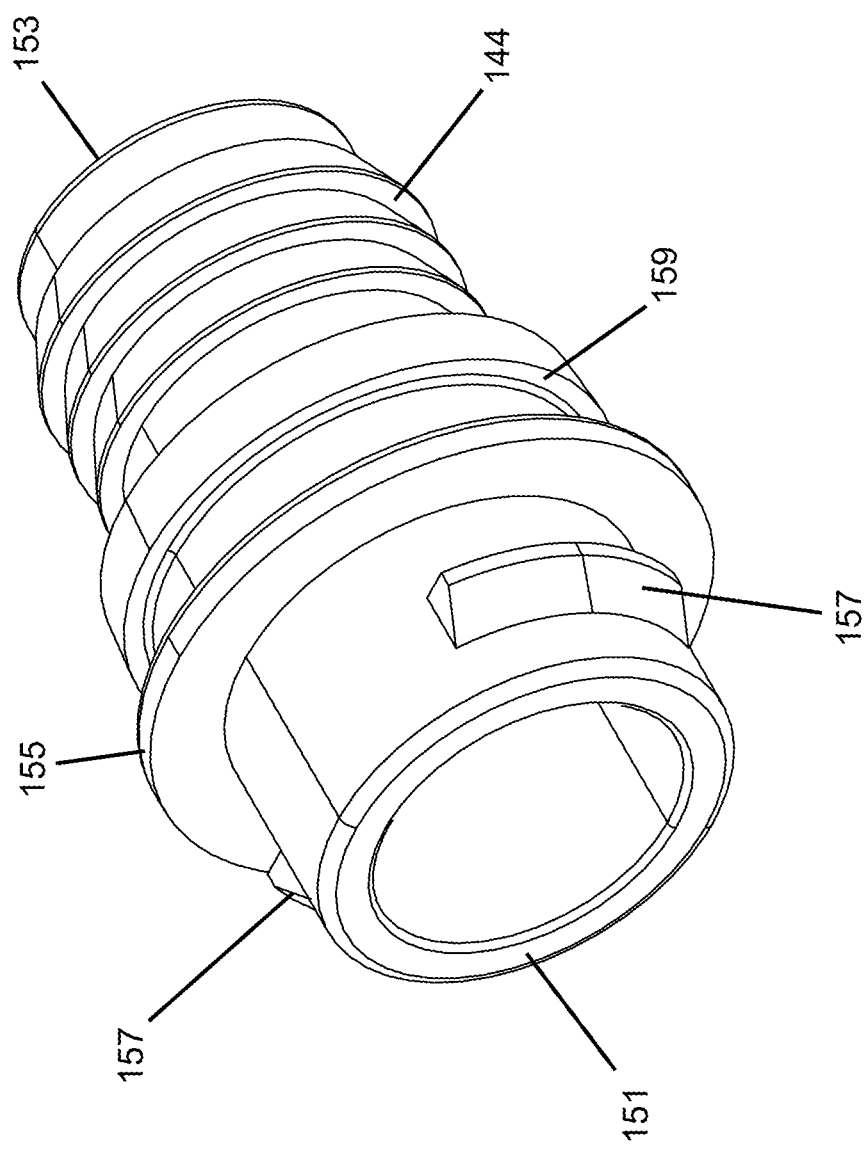
FIG. 12 is a perspective view of an example rear housing suitable for use with the core housing of FIG. 11.

FIG. 12 illustrates one example implementation of a rear housing 150 suitable for use with the core housing 118, 318 disclosed herein. The rear housing 150 extends between first and second axial ends 151, 153. The first axial end 151 defines a spring stop against which one end of the spring 116 abuts when the core housing 118, 318 is assembled around the spring 116. The rear housing 150 also defines the cable anchor location 144 of the core housing 118, 318 at the second axial end 153.

In some implementations, the cable anchor location 144 includes a support surface against which a crimp sleeve 122 can be radially compressed to sandwich the cable jacket 105 and/or cable strength members. In certain examples, the cable anchor location 144 includes one or more ribs or other protrusions that enhance friction between the crimp sleeve 122 and the cable jacket 105 and/or strength members. In other implementations, the cable anchor location 144 provides a surface to which the cable jacket 105 and/or strength members can be adhesively affixed.

In certain implementations, the strain relief boot 124 also is coupled to the core housing 118, 218, 318 over the cable anchor location 144. In certain examples, the rear housing 150, 250 defines a forward-facing catch surface 159 that the boot 124 engages (e.g., snaps over). In certain examples, the cable anchor location 144 is disposed between the forward-facing catch surface 159 and the second axial end 152 of the rear housing 150, 250. In certain examples, the forward-facing catch surface 159 is defined by a circumferential rib extending radially outwardly from the rear housing 150, 250.

The rear housing 150, 250 is configured to attach to a remainder of the core housing 118, 218, 318 (e.g., to the front housing or to an intermediate housing). In certain implementations, the rear housing 150, 250 is configured to latch to the remainder of the core housing 118, 218, 318. In certain examples, the rear housing 150 includes catch members 157 that fit within apertures defined by the remainder of the core housing 118, 218, 318. In the example shown, the catch members 157 define forwardly-facing ramp surfaces and rearwardly facing shoulders. In some examples, the catch members 157 are not deflectable. In other examples, the catch members 157 are deflectable relative to the cable anchor location 144.

In certain examples, the rear housing 150 includes a radial flange 155 disposed intermediate the catch members 157 and the cable anchor location 144. In certain examples, the radial flange 155 is disposed between the catch members 157 and the circumferential rib defining the catch surface 159. The radial flange 155 defines a forward-facing engagement surface that abuts the rear surface of the remainder of the core housing 118. In certain examples, the radial flange 155 has a larger cross-dimension than the circumferential rib defining the forward-facing catch surface 159. In an example, the radial flange 155 has the largest cross-dimension of the rear housing 150.

Figure 13:
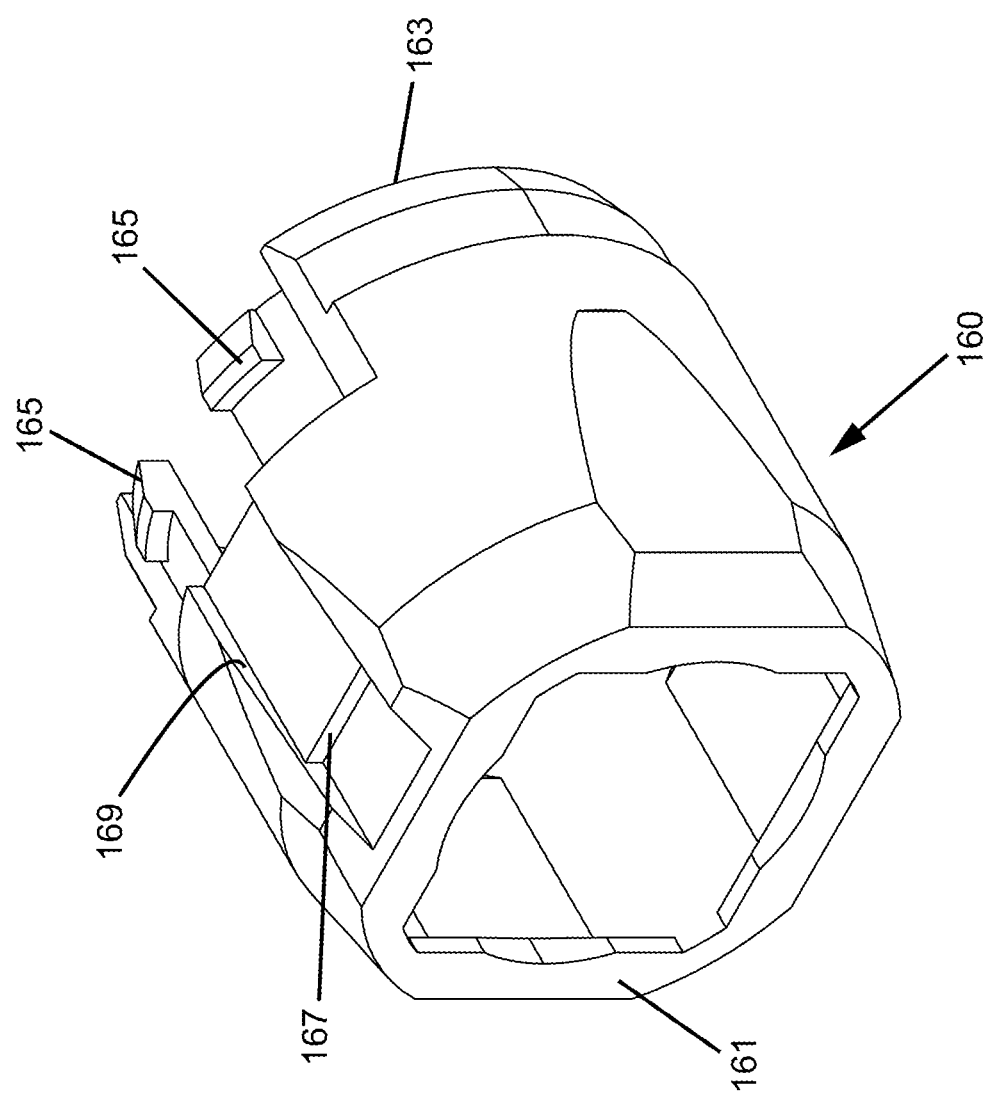
FIG. 13 is a perspective view of an example front housing suitable for use with the core housing of FIG. 11.

FIG. 13 illustrates one example implementation of a front housing 160 suitable for use with the core housing 118 disclosed herein. The front housing 160 couples, directly or indirectly, to the rear housing 150 to at least partially enclose the ferrule assembly 114 therebetween. The front housing 160 extends between first and second axial ends 161, 163. The first axial end 161 of the front housing 160 is configured to inhibit forward movement of the ferrule assembly 114 beyond the front housing 160. For example, the first axial end 161 of the front housing 160 may include a stop surface that extends over a front of the ferrule hub 134 (e.g., see FIG. 8).

The second axial end 163 of the front housing 160 defines the attachment features that enable the front housing 160 to couple to the rear housing 150. In some examples, the attachment features are sized and shaped to engage the catch members of the rear housing 150. In other examples, the attachment features are sized and shaped to engage complementary attachment features of an intermediate housing 170, which has additional attachment features that complement the catch members 157 of the rear housing. In the example shown, the attachment features of the front housing 160 include latching hooks 165.

In certain implementations, the front housing 160 defines a stop surface 167 that aligns with the stop surface 185 within the plug body passage 181. Engagement between the stop surfaces 167, 185 inhibits further forward movement of the front housing 160, and hence the connector core 110, within the plug body 112. In certain examples, the stop surface 167 is disposed towards the first axial end 161 of the front housing 160. In certain examples, the stop surface 167 is recessed rearwardly from the first axial end 161 of the front housing 160.

In certain implementations, the front housing 160 defines a keyway 169 in which to receive the stop member 185. The stop surface 167 is disposed within the keyway 169. In such implementations, engagement between the stop surface 185 and the keyway 169 provides a rotational key between the connector core 110 and the plug body 112. Rotationally keying the connector core 110 and the plug body 112 enables the connector core 110 to be tuned at the factory and then be installed at the plug body 112 in the tuned orientation.

Figure 14:
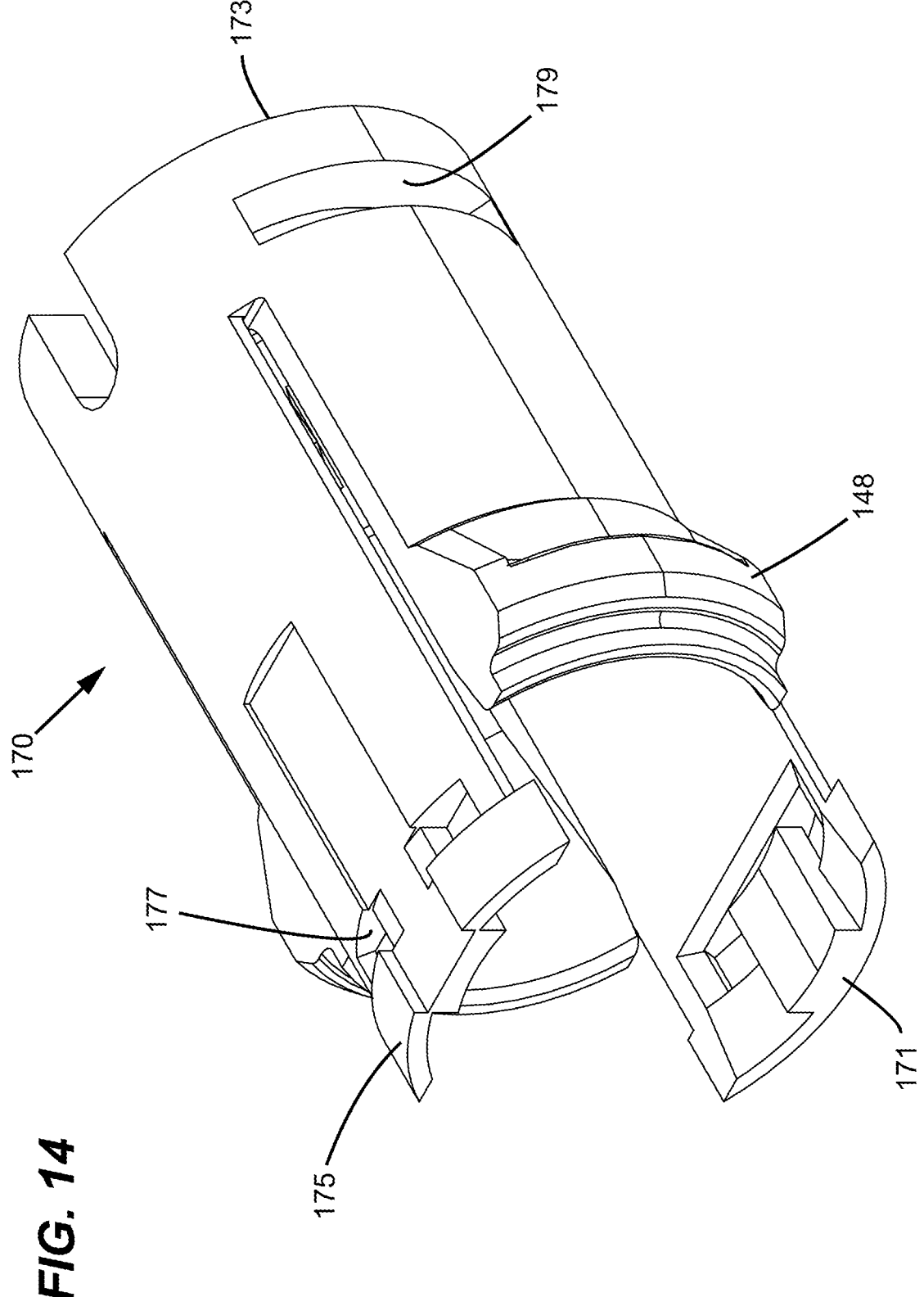
FIG. 14 is a perspective view of an example intermediate housing suitable for use with the core housing of FIG. 11.

FIG. 14 illustrates one example implementation of an intermediate housing 170, 370 suitable for use with the core housing 118, 318 disclosed herein. The intermediate housing 170, 370 mechanically couples the front housing 160, 360 to the rear housing 150. In certain implementations, the intermediate housing 170, 370 carries the first part 148, 348 of the latching arrangement of the connector core 110, 310. The intermediate housing 170 extends between a first axial end 171 and a second axial end 173. The first axial end 171 of the intermediate housing 170, 370 is configured to attach to the second axial end 163 of the front housing 160, 360. The second axial end 173 of the intermediate housing 170, 370 is configured to attach to the first axial end 151 of the rear housing 150.

In certain implementations, the first axial end 171 of the intermediate housing 170 includes a deflectable extension 175 defining one or more apertures 177. In certain examples, multiple deflectable extensions 175 are disposed at the first axial end 171. Each deflectable extension 175 defines one or more apertures 177. In the example shown, the intermediate housing 170 has two deflectable extensions 175 that each define a pair of apertures 177. The deflectable extensions 175 ride over the latching hooks 165 of the front housing 160 until the latching hooks 165 snap into the apertures 177 when the intermediate housing 170 is translated towards the front housing 160. In other implementations, the intermediate housing 370 carries latching hooks and the front housing 360 defines the apertures on deflectable extensions.

In certain implementations, the second axial end 173 of the intermediate housing 170, 370 defines one or more slots 179 or apertures sized to receive the one or more catch members 157 of the rear housing 150. In certain examples, slots 179 or apertures are defined in deflectable sections of the intermediate housing 170, 370. For example, an elongate notch may extend inward from the second axial end 173 to provide limited deflection of the slots 179 or apertures relative to the catch members 157. In other examples, the catch members 157 of the rear housing 150 may be inwardly deflectable. In other implementations, catch members can be disposed at the second axial end 173 of the intermediate housing 170, 370 and corresponding slots/apertures can be disposed at the first axial end 151 of the rear housing 150.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. An optical cable assembly, comprising:
    an optical cable including a jacket surrounding an optical fiber; and
    an elongate connector core terminating the optical cable, the elongate connector core having a maximum transverse cross-dimension of no more than 5 millimeters, the elongate connector core including:

a ferrule assembly including an optical ferrule that receives the optical fiber, the ferrule assembly also including a hub supporting the optical ferrule;

a spring mounted over the optical fiber; and a protective arrangement including a core housing that surrounds the spring and at least a portion of the ferrule assembly, the protective arrangement extending between a first axial end and a second axial end that are opposite each other, the jacket of the optical cable being anchored at the second axial end, wherein the ferrule extends beyond the core housing.

2. The optical cable assembly of claim 1, wherein the core housing comprises:

a rear housing to which the jacket of the cable is anchored; and a front housing that couples to the rear housing to sandwich the ferrule assembly and the spring therebetween.

3. The optical cable assembly of claim 1, further comprising a plug body that mounts over the elongate connector core, the elongate connector core including a first part of a latching arrangement, the plug body defining an interior that includes a second part of the latching arrangement, the second part of the latching arrangement engaging the first part of the latching arrangement to retain the plug body on the elongate connector core, wherein the core housing forms the first part of the latching arrangement.

4. The optical cable assembly of claim 3, wherein the core housing also includes an intermediate housing that couples the rear housing to the front housing, the intermediate housing forming the first part of the latching arrangement.

5. The optical cable assembly of claim 3, wherein the first part of the latching arrangement includes radially deflectable latch arms.

6. The optical cable assembly of claim 3, wherein the first part of the latching arrangement includes catch surfaces disposed at an exterior of the core housing.

7. The optical cable assembly of claim 3, wherein the protective arrangement also includes a sleeve that mounts over the core housing to surround at least part of an exterior of the core housing, the sleeve being axially movable relative to the core housing between a traveling position and an assembled position, wherein the sleeve covers the first part of the latching arrangement when in the traveling position and wherein the sleeve provides access to the first part of the latching arrangement when in the assembled position.

8. The optical cable assembly of claim 7, wherein the core housing includes latching arms that deflect radially towards and away from the optical fiber, wherein the sleeve inhibits radial deflection of the latching arms when disposed in the traveling position and enables radial deflection of the latching arms when disposed in the assembled position.

9. The optical cable assembly of claim 8, wherein the sleeve has a circumferential wall that either:

defines apertures that align with the latching arms when the sleeve is disposed in the assembled position; or is devoid of apertures.

10. The optical cable assembly of claim 7, wherein the interior of the plug body also includes a catch member that engages the sleeve to move the sleeve from the traveling position to the assembled position when the plug body is mounted over the housing.

11. The optical cable assembly of claim 1, wherein the protective arrangement also includes a pushing cap that mounts over the ferrule to cover an end face of the ferrule, wherein the pushing cap is detachable from the ferrule while the core housing continues to surround the spring and the at least a portion of the ferrule assembly.

12. The optical cable assembly of claim 1, wherein the elongate connector core also includes a boot mounted to the second axial end of the protective arrangement; and wherein the cable jacket is anchored to the second axial end of the protective arrangement using a crimp sleeve.

13. The optical cable assembly of claim 3, wherein the plug body defines an SC interface.

14. An optical connector kit, comprising:

a ferrule assembly including a ferrule hub supporting an optical ferrule defining an end face;

a spring sized to fit over a portion of the ferrule hub;

a core housing configured to surround the spring and the ferrule assembly, the core housing having a maximum transverse cross-dimension of no more than 5 millimeters; and a plug body defining a passage extending between opposite first and second ends, the passage sized to accommodate the core housing therein, wherein the plug body is configured to latch to the core housing;

wherein the core housing defines radially flexible latch arms; and wherein the kit further includes a core sleeve that can be mounted over the core housing such that the core sleeve is movable relative to the core housing between a traveling position in which the core sleeve inhibits radial deflection of the latch arms and an assembled position in which the core sleeve allows radial deflection of the latch arms.

15. An optical connector kit, comprising:

a ferrule assembly including a ferrule hub supporting an optical ferrule defining an end face;

a spring sized to fit over a portion of the ferrule hub; and a core housing configured to surround the spring and the ferrule assembly, the core housing having a maximum transverse cross-dimension of no more than 5 millimeters, wherein the core housing includes a rear housing and a front housing that can cooperate to enclose the ferrule hub and the spring;

wherein the core housing also includes an intermediate housing that can couple the rear housing to the front housing; and wherein the kit further includes a pushing cap configured to mount over the ferrule of the ferrule assembly.

16. A protective arrangement to be assembled over a ferrule assembly terminating an optical fiber, the protective arrangement extending between a first axial end and a second axial end, the protective arrangement comprising:

a core housing defining the second axial end of the protective arrangement, the core housing surrounding at least a portion of the ferrule assembly, and an exterior of the core housing having a maximum transverse cross-dimension of no more than 5 millimeters;

a pushing cap extending between a closed end and an open end, the closed end defining the first axial end of the protective arrangement, the pushing cap defining an interior sized to receive an end face of the ferrule assembly through the open end; and a latching arrangement including engagement members disposed at the exterior of the core housing at an intermediate location between the first axial end and the second axial end, wherein the pushing cap abuts the core housing, but does not attach to the core housing.

17. The optical cable assembly of claim 1, wherein the hub is mounted about a rear of the optical ferrule; and wherein the core housing includes a rear housing and a front housing that cooperate to enclose the ferrule hub and the spring.

18. An optical connector kit, comprising:

a ferrule assembly including a ferrule hub supporting an optical ferrule defining an end face;

a spring sized to fit over a portion of the ferrule hub; and a core housing configured to surround the spring and the ferrule assembly, the core housing having a maximum transverse cross-dimension of no more than 5 millimeters, wherein the core housing includes a rear housing and a front housing assembly that can cooperate to enclose the ferrule hub and the spring, the front housing assembly having a closed front end and an open rear end.

\* \* \* \* \*